US011265203B2

(12) United States Patent
Margalit et al.

(10) Patent No.: US 11,265,203 B2
(45) Date of Patent: *Mar. 1, 2022

(54) SYSTEM AND METHOD FOR PROCESSING ALERTS INDICATIVE OF CONDITIONS OF A COMPUTING INFRASTRUCTURE

(71) Applicant: ServiceNow, Inc., Santa Clara, CA (US)

(72) Inventors: Adar Margalit, Modiin (IL); Yuval Rimar, Petah Tikva (IL); Vadim Shif, Petah Tikva (IL); Netta Hasdai, Tel Aviv (IL)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/592,416

(22) Filed: Oct. 3, 2019

(65) Prior Publication Data

US 2020/0106659 A1 Apr. 2, 2020

Related U.S. Application Data

(63) Continuation of application No. 15/178,855, filed on Jun. 10, 2016, now Pat. No. 10,454,752.
(Continued)

(51) Int. Cl.
*G06F 15/16* (2006.01)
*H04L 41/0604* (2022.01)
(Continued)

(52) U.S. Cl.
CPC ........ *H04L 41/0604* (2013.01); *G06F 11/079* (2013.01); *G06F 11/0709* (2013.01);
(Continued)

(58) Field of Classification Search
CPC .............. G06F 11/0709; G06F 11/079; G06F 11/3006; G06F 11/3055; G06F 11/34;
(Continued)

(56) References Cited

U.S. PATENT DOCUMENTS 6,321,229 B1 11/2001 Goldman
6,609,122 B1 8/2003 Ensor
(Continued)

FOREIGN PATENT DOCUMENTS

| WO | WO-2012088344 A1 * | 6/2012 | ............. G06Q 40/00 |
| WO | WO-2013055760 A1 * | 4/2013 | ............. G06F 11/079 |
| WO | WO-2015116155 A1 * | 8/2015 | ............. G06Q 10/06 |

OTHER PUBLICATIONS

Change impact analysis for a class hierarchy Yoon Kyu Jang;Heung Seok Chae;Yong Rae Kwon;Doo Hwan Bae Proceedings 1998 Asia Pacific Software Engineering Conference (Cat. No. 98EX240) (Year: 1998).*
(Continued)

*Primary Examiner* — Oscar A Louie
*Assistant Examiner* — Oluwatosin M Gidado
(74) *Attorney, Agent, or Firm* — Fletcher Yoder PC

(57) ABSTRACT

Systems and methods for processing alerts indicative of conditions of nodes of a computing infrastructure are herein disclosed as comprising, in an implementation, generating a node hierarchy comprising nodes associated with a service model, wherein relationships between the nodes are based on impact rules, identifying alerts related to the node hierarchy, wherein the alerts are indicative of impairments affecting at least a portion of the node hierarchy, and performing impact calculation for nodes of the node hierarchy based on the identified alerts. In an implementation, the impact values may be calculated in parallel for nodes indicated for processing. In an implementation, the nodes
(Continued)

associated with the service model represent infrastructure or applicative resources and comprise nodes included in the service model and nodes related to, but not included in, the service model.

17 Claims, 13 Drawing Sheets

Related U.S. Application Data

(60) Provisional application No. 62/249,597, filed on Nov. 2, 2015, provisional application No. 62/249,611, filed on Nov. 2, 2015.

(51) Int. Cl.
*G06F 11/34* (2006.01)
*G06F 11/07* (2006.01)
*G06Q 50/10* (2012.01)
*H04L 41/0686* (2022.01)
*H04L 43/08* (2022.01)
*G06F 11/30* (2006.01)

(52) U.S. Cl.
CPC ............. *G06F 11/34* (2013.01); *G06Q 50/10* (2013.01); *H04L 41/0686* (2013.01); *H04L 43/08* (2013.01); *G06F 11/3006* (2013.01); *G06F 11/3055* (2013.01); *G06F 11/3409* (2013.01)

(58) Field of Classification Search
CPC .............. G06F 11/3409; H04L 41/0604; H04L 41/0686; H04L 43/08
See application file for complete search history.

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,896,586 B2 | 5/2005 | Brasher |
| 6,983,321 B2 | 1/2006 | Trinon et al. |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg et al. |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,756,828 B2 | 1/2010 | Baron et al. |
| 7,685,157 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,774,458 B2 | 8/2010 | Trinon et al. |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon et al. |
| 7,933,927 B2 | 4/2011 | Dee |
| 7,945,860 B2 | 5/2011 | Vambenepe |
| 7,966,398 B2 | 6/2011 | Wiles |
| 7,992,040 B2 | 8/2011 | Agarwal et al. |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,296,412 B2 * | 10/2012 | Secor ................... G06Q 10/087 709/223 |
| 8,301,755 B2 * | 10/2012 | De Peuter .............. G06Q 10/10 709/223 |
| 8,380,645 B2 | 2/2013 | Kowalski |
| 8,402,127 B2 | 3/2013 | Solin |
| 8,407,170 B2 | 3/2013 | Harrison et al. |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 4/2015 | Vos |
| 9,053,139 B2 | 6/2015 | Sasatani |
| 9,098,322 B2 | 8/2015 | Apte |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,818,628 B2 | 11/2017 | Moon |
| 9,852,165 B2 | 12/2017 | Morozov |
| 9,971,677 B2 | 5/2018 | Cmielowski |
| 10,002,203 B2 | 6/2018 | George |
| 2006/0294220 A1 * | 12/2006 | Asahara ............... H04L 41/0813 709/224 |
| 2009/0240510 A1 | 9/2009 | Hopkins et al. |
| 2013/0208880 A1 * | 8/2013 | Lovy ..................... H04L 43/045 379/265.03 |
| 2013/0332590 A1 * | 12/2013 | Mohaban et al. .... G06F 21/577 705/1.1 |
| 2014/0122706 A1 | 5/2014 | Boemer et al. |
| 2015/0113337 A1 | 4/2015 | Otsuka et al. |
| 2015/0134589 A1 * | 5/2015 | Marrelli ................ G06F 16/258 707/602 |

OTHER PUBLICATIONS

Impact of model uncertainties on quantitative evaluation of interference risks Janne Riihijärvi;Daisy Maibam;Petri Mähönen 2017 IEEE International Symposium on Dynamic Spectrum Access Networks (DySPAN) (Year: 2017).*
Reducing variations in parallel efficiency for unstructured grid computations B. Worner;U. Geuder;M. Hardtner;R. Zink Proceedings of 3rd IEEE International Symposium on High Performance Distributed Computing (Year: 1994).*

* cited by examiner

*1100*

| NUMBER | SEVERITY | NODE | UPDATED |
|---|---|---|---|
| ALERT0010043 | MAJOR | NODE_ID:13 | 20151102_164210 |
| ALERT0010044 | CRITICAL | NODE_ID:15 | 20151102_164212 |
| ALERT0010045 | MINOR | NODE_ID:12 | 20151102_164218 |
| ALERT0010046 | CRITICAL | NODE_ID:15 | 20151102_164220 |

| NAME | INFLUENCE | IMPACT WHEN CRITICAL | IMPACT WHEN MAJOR | IMPACT WHEN MINOR | IMPACT WHEN WARNING |
|---|---|---|---|---|---|
| CONTAINMENT | 100% | CRITICAL | MAJOR | MINOR | WARNING |
| HOST IN CLUSTER | 50% | MAJOR | MINOR | WARNING | INFO |
| INCLUSION | 100% | CRITICAL | MAJOR | MINOR | WARNING |
| NETWORK PATH | 50% | MINOR | WARNING | INFO | INFO |

SYSTEM AND METHOD FOR PROCESSING ALERTS INDICATIVE OF CONDITIONS OF A COMPUTING INFRASTRUCTURE

CROSS REFERENCE TO RELATED APPLICATIONS

This is a continuation of U.S. patent application Ser. No. 15/178,855, filed Jun. 10, 2016; which claims the benefit of U.S. Provisional Application No. 62/249,597, filed Nov. 2, 2015, entitled "System and Method for Processing Alerts Indicative of a Condition of a Computing Network," and U.S. Provisional Application No. 62/249,611, filed Nov. 2, 2015, entitled "System and Method for Processing Alerts and Synchronizing Data Indicative of a Condition of a Computing Network," the disclosures of which are herein incorporated by reference.

TECHNICAL FIELD

The present disclosure relates to systems and methods for processing alerts indicative of conditions of a computing infrastructure. More generally, the present disclosure relates to a data processing system for error or fault handling, namely, by processing data used for and generated in response to performing impact calculation on resources of a computing infrastructure. Implementations of the present disclosure can be used to enhance the ability of a server programmed for organizing and manipulating data, namely, by identifying impairments affecting the function of hardware and software resources associated with a service of a computing infrastructure.

BACKGROUND

Computing networks can be used for exchanging and storing data. Proper maintenance of infrastructures of computing networks can enable the infrastructures and networks to operate at full capacity and with limited interruption. Various computing tools exist for enabling system administrators to initiate, carry out, and monitor a variety of maintenance functions. Beyond standard maintenance, it is also important to monitor the health and status of the hardware and software resources of services provided by a computing infrastructure. Monitoring tools help ensure that repairs and updates are conducted and executed promptly by drawing the attention of system administrators and remediation programs. Monitoring tools also perform other useful functions, such as helping system administrators to reallocate resources, notify users, and make system configuration decisions.

SUMMARY

Disclosed herein are implementations of systems and methods for processing alerts indicative of conditions of a computing infrastructure. In an implementation, a system is provided for processing alerts indicative of conditions of nodes of a computing infrastructure. The system comprises a server comprising a processor and a memory, wherein the memory includes code executable by the processor to execute a configuration management database comprising nodes representative of at least one of an infrastructure resource or an applicative resource in the computing infrastructure and a system management module configured to generate a node hierarchy comprising nodes associated with a service model, wherein relationships between the nodes are based on impact rules, identify alerts related to the node hierarchy, wherein the alerts are indicative of impairments affecting at least a portion of the node hierarchy, and perform impact calculation for nodes of the node hierarchy based on the identified alerts by indicating a first set of nodes comprising nodes of the node hierarchy having a severity that changed based on the identified alerts, calculating an impact value in parallel for each node of the first set of nodes based on the severity and the impact rules applicable to the first set of nodes, indicating a second set of nodes comprising nodes of the node hierarchy having a severity that changed based on the impact value calculated for any nodes of the first set of nodes, and calculating an impact value in parallel for each node of the second set of nodes based on the severity and the impact rules applicable to the second set of nodes.

In an implementation, a method is provided for processing alerts indicative of conditions of nodes of a computing infrastructure. The method comprises a configuration management database comprising nodes representative of at least one of an infrastructure resource or an applicative resource in the computing infrastructure, comprising generating a node hierarchy comprising nodes associated with a service model, wherein relationships between the nodes are based on impact rules, identifying alerts related to the node hierarchy, wherein the alerts are indicative of impairments affecting at least a portion of the node hierarchy, and performing impact calculation for nodes of the node hierarchy based on the identified alerts by indicating a first set of nodes comprising nodes of the node hierarchy having a severity that changed based on the identified alerts, calculating an impact value in parallel for each node of the first set of nodes based on the severity and the impact rules applicable to the first set of nodes, indicating a second set of nodes comprising nodes of the node hierarchy having a severity that changed based on the impact value calculated for any nodes of the first set of nodes, and calculating an impact value in parallel for each node of the second set of nodes based on the severity and the impact rules applicable to the second set of nodes.

In an implementation, a system comprises a memory and a processor configured to execute instructions stored in the memory to generate a node hierarchy based on configurable impact rules applicable to nodes associated with a service model, identify alerts relating to the node hierarchy, perform parallel impact calculation for all nodes of the node hierarchy affected by the alerts, and update the node hierarchy in response to performing the parallel impact calculation.

Details of these implementations, modifications of these implementations, and additional implementations are described below.

BRIEF DESCRIPTION OF THE DRAWINGS

The description herein makes reference to the accompanying drawings, where like reference numerals refer to like parts throughout the several views.

FIG. 11 is an illustration of an implementation of an alert table listing alerts for nodes of a node hierarchy.

FIG. 12 is an illustration of an implementation of an impact rule table referencing the impact rules used for calculating severity of nodes of a node hierarchy based on identified alerts.

DETAILED DESCRIPTION

Figure 1:
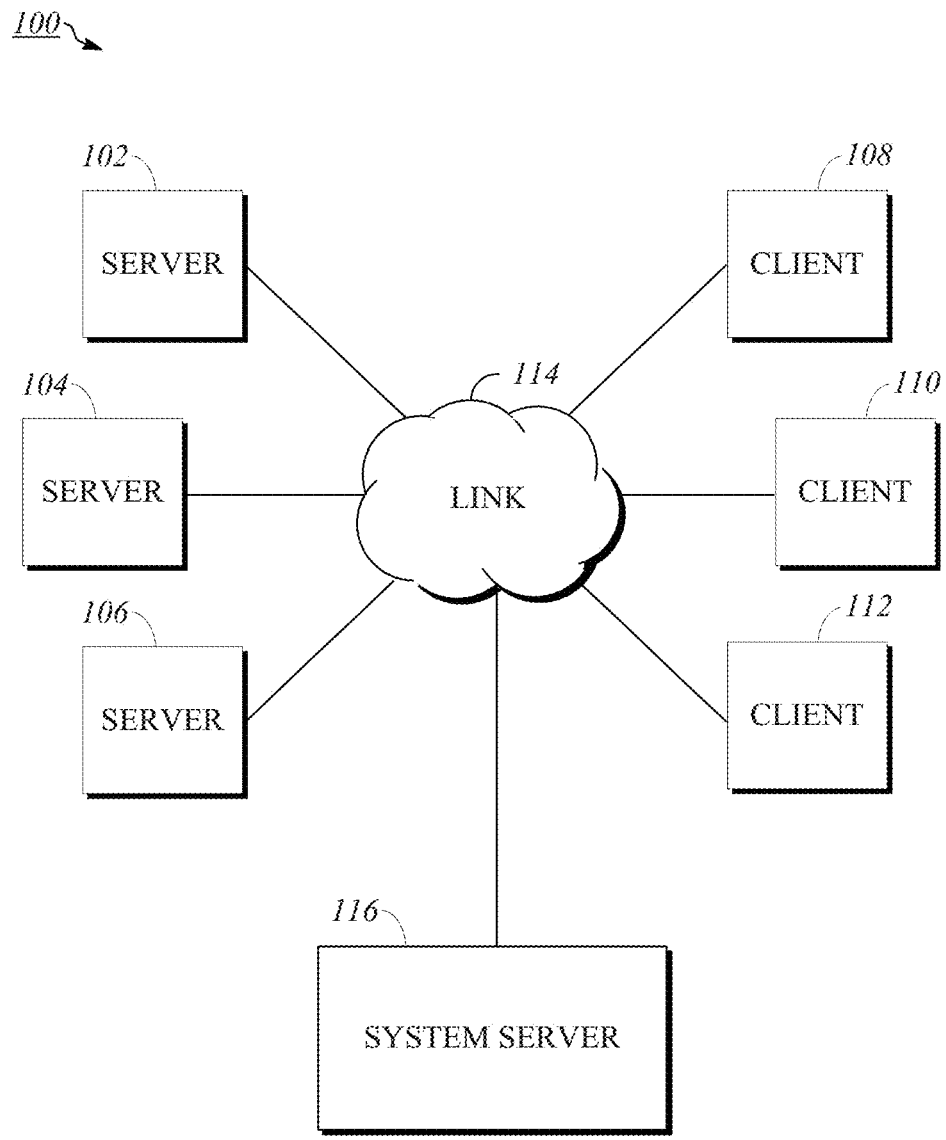
FIG. 1 is a block diagram of an implementation of a computing network.

The health and status of services deliverable by a computing infrastructure can be monitored based on the hardware and software resources involved in delivering those services. Such resources may be represented by configuration items, or nodes, within a configuration management database (CMDB). It is desirable that an operator of an infrastructure of a computing network, such as a system administrator, be able to readily identify impairments (whether potential, actual, or otherwise) affecting the function of resources. In an implementation, monitoring the health and status of a computing infrastructure can include determining the degree to which an identified impairment affects a resource and the extent to which other aspects of the computing infrastructure are affected as a result, a process referred to as impact calculation.

Impact calculation can be performed across an entire CMDB to identify each individual resource affected by an identified impairment. However, this is often unnecessarily over-encompassing, as it includes evaluating resources unrelated to the impairment (e.g., by requiring that all nodes in the CMDB be tracked and evaluated each time impact calculation is performed). It may also fail to recognize situations where the impact calculation depends on the context in which a given resource is used, for example, where one function of a database server is severely impacted and another function of it is only minimally impacted. A solution to these problems includes grouping the nodes of a CMDB into configurations of deployed services, or service models, representing service environments of a customer infrastructure. This way, impact calculation can be performed on specific service models without spending time or processing power to track or evaluate nodes of the CMDB unrelated to a given identified impairment. However, this solution is sub-optimal for at least a few reasons. First, it does not perform impact calculation for resources associated with, but not included within, a specific service model, and so it focuses only on resources included within specific service models. Second, it does not allow a user to reconfigure the nature of the connections, or relationships, between resources included in the service models. Impact calculation cannot provide an accurate understanding of functional impairment for a service model where some of the related resources are not mapped or up-to-date.

Implementations of the present disclosure include systems and methods for performing impact calculation, including allowing a user to configure the configuration items associated with a service model and/or the relationship between configuration items associated with a service model. A node hierarchy representative of a service model may be generated by applying impact rules to nodes associated with the operation or function of the service model. The nodes of the node hierarchy may be configured to represent resources native to the service model (e.g., those included within the service model by default) and/or non-native resources otherwise associated with the service model, for example, based on changes to the included resources, changes to the operation or function of the service model, etc. The impact rules can include instructions for estimating the impact of an identified impairment on applicable nodes by defining the relationships between nodes of the service model and may be configured, for example, based on changes to the service model, a history of identified impairments, etc.

The nodes and dependency relationships of a service model can be identified by a discovery process. Whereas certain solutions for performing impact calculation include only a discovery process for identifying resources based on a top-down (e.g., vertical) discovery, for example, where a probe searches for related nodes starting with an entry into the service model, implementations of the present disclosure include both vertical and horizontal discovery. Horizontal discovery can be used to identify resources not included within a service model, but associated with the service model based, for example, on a relationship between them and resources that are included within the service model. Horizontal discovery can further indicate situations where a given resource reflects multiple impact values, such as where the effect of an identified impairment on a particular resource is greater when evaluating the resource in the context of a first service model than how the resource is affected within a second service model. In an implementation, a service model comprises an applicative layer and an infrastructure layer and impact rules may apply to either or both. In that impact rules are configurable, the strategies defined by the impact rules for generating the node hierarchy are extendable in order to meet the specific needs of a user for monitoring the health and status of their service models, for example, where those service models to not conform to default structural or relational behaviors.

By identifying nodes affected by an identified impairment, or alert, impact calculation can be performed in parallel for each affected node. That is, implementations of the present disclosure include indicating nodes affected by an identified alert and nodes depending from those nodes for impact calculation, performing impact calculation on the indicated nodes (e.g., simultaneously or essentially so, such as to the extent permitted by hardware) to calculate an impact value, or severity, indicating nodes having a severity that changed in response to the performed impact calculation, performing impact calculation on the newly indicated nodes, etc. For example, a node affected by an identified alert can be indicated using a flag, for example, within a node header or graphically on a user interface representing the node hierarchy. That node can then be processed in parallel along with other indicated nodes to uniformly calculate impact for applicable nodes of the node hierarchy. Because impact calculation can be performed in parallel for applicable nodes of the node hierarchy (e.g., regardless of the underlying topology of the subject service model), the impact calculation may be performed in a multi-threaded or distributed environment. The uniform and parallel nature in which impact calculation can be performed minimizes the need for performing further impact calculations where updates relevant to impact are made with respect to the service model, for example, by identifying new alerts, a change in the underlying topology, etc. For example, this process may permit the impact to be recalculated for only a portion of the service model in parallel such as when an update does not affect remaining portions of a service model. The terms "impact," "impact value," and "severity" and related terms may be used interchangeably throughout this disclosure to refer to a result of performing impact calculation and/or a previously identified or alternative severity for nodes.

In an implementation, resources refer to infrastructure resources (e.g., hardware components, such as switches, routers, servers, modems, processors, I/O interfaces, memory or storage, power supplies, biometric readers, media readers, etc.) and/or applicative resources (e.g., software components, such as platform applications, modules, routines, firmware processes, and other instructions executable by or in connection with infrastructure resources). Resources can also refer to computing features such as documents, models, plans, sockets, virtual machines, etc. In an implementation, resources can refer to physical and/or virtual implementations of the foregoing, as applicable. The present disclosure may occasionally make specific reference, for example, to "infrastructure resources" or "applicative resources" for certain uses of resources; however, where the disclosure merely references "resources," it may refer to any of the foregoing types of resources, unless the context specifically indicates otherwise. Further, the terms "resources" and "nodes" may be interchangeably used throughout this disclosure, for example, such that references to a resource of a computing infrastructure may also refer to the CMDB node representing that resource and references to a CMDB node may also refer to the computing infrastructure resource it represents.

The systems and methods of the present disclosure address problems particular to computing networks, for example, those concerning the health and status of resources associated with service models of a computing infrastructure wherein resources and service models are subject to change. These computing network-specific issues can be solved by implementations of the present disclosure. For example, proper monitoring of a computing infrastructure can be facilitated by extendable and scalable impact rules and node associations for generating a node hierarchy. The development of new ways to monitor network resources to, for example, identify system impairment and indicate areas requiring maintenance is fundamentally related to computer networks. Implementations of the present disclosure can provide a way to efficiently identify areas of possible impairment by identifying resources associated with, but not necessarily included in, service models and perform parallel impact calculation across all nodes defining a node hierarchy.

To describe some implementations in greater detail, reference is first made to examples of hardware structures and interconnections usable in implementations of the present disclosure. FIG. 1 is a block diagram of an implementation of a computing network. Computing network 100 includes various computer resources including servers 102, 104, 106 and client computers 108, 110, 112 (also referred to as clients) interconnected to computing network 100 and each other via telecommunications link 114. One example of link 114 is the public Internet, and other examples include multiple local area networks, wide area networks, Intranets, Extranets, Internetworks, Wi-Fi networks, or any other suitable technology using wires, radiofrequency, microwave, satellite, cellular, optical, or other telecommunications systems. Computing network 100 includes digital data storage, which may be represented by one or more of servers 102, 104, 106. Examples of the hardware components and interconnections of servers 102, 104, 106, clients 108, 110, 112, and various data storage are discussed in detail below. In an implementation, servers 102, 104, 106 store and manage client data. Client data may be stored in a single site, location, or device. Alternatively, client data may be distributed among different sites, locations, or devices. Without any intended limitation, a single-client arrangement is used as an example throughout this disclosure.

Computing network 100 also includes system server 116, which can be programmed to relay selected information for display by clients 108, 110, 112. Another function of system server 116 can be to assemble, collect, convert, format, and otherwise prepare output for display to the various networked clients via link 114. In an implementation, system server 116 can be separate from servers 102, 104, 106. In an implementation, system server 116 can be or can be included as part of one or more of servers 102, 104, 106.

In an implementation, computing network 100 may be applied to the task of cloud computing. Cloud computing may provide various advantages over traditional computing models, including the ability to allocate shared resources amongst many different customers. Under traditional computing models, computing resources are typically allocated to a single customer or entity and substantial portions of those resources may remain unused or underused.

Computing resources of the cloud computing infrastructure may be allocated, for example, using a multi-tenant or single-tenant architecture. Under a multi-tenant architecture, installations or instantiations of application, database, and/or other software application servers may be shared amongst multiple customers. For example, a web server (e.g., a unitary Apache installation), application server (e.g., unitary Java Virtual Machine) and/or a single database server catalog (e.g., a unitary MySQL catalog) may handle requests from multiple customers. In an implementation of this architecture, the application and/or database server software can distinguish between and segregate data and other information of the various customers using the system.

In a single-tenant infrastructure, separate web servers, application servers, and/or database servers can be provisioned for each customer instance. In an implementation, each customer will access its dedicated web server(s), will have its transactions processed using its dedicated application server(s), and will have its data stored in its dedicated database server(s) and or catalog(s). Physical hardware servers may be shared such that multiple installations or instantiations of web, application, and/or database servers may be installed on the same physical server. Each installation may be allocated a certain portion of the physical server resources, such as RAM, storage, and CPU cycles.

In an implementation, a customer instance comprises multiple web server instances, multiple application server instances, and multiple database server instances. The server instances may be located on different physical servers and share resources of the different physical servers with a number of other server instances associated with other customer instances. In a given cloud computing system, different implementations of customer instances may be used for different customer instances at the same time. Other configurations and implementations of customer instances may also be used. For example, in an implementation, web server and application server functionality are treated as a single unit (of which there may be multiple units present), each unit being installed on respective physical servers.

In an implementation, web, application, or database servers may be allocated to different datacenters to facilitate high availability of the applications and data provided by the servers. For example, there may be a primary pair of web servers and application servers in a first datacenter and a backup pair of web servers and application servers in a second datacenter. Alternatively, there may be a primary database server in the first datacenter and a second database server in the second datacenter wherein the primary database server replicates data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers.

Figure 2:
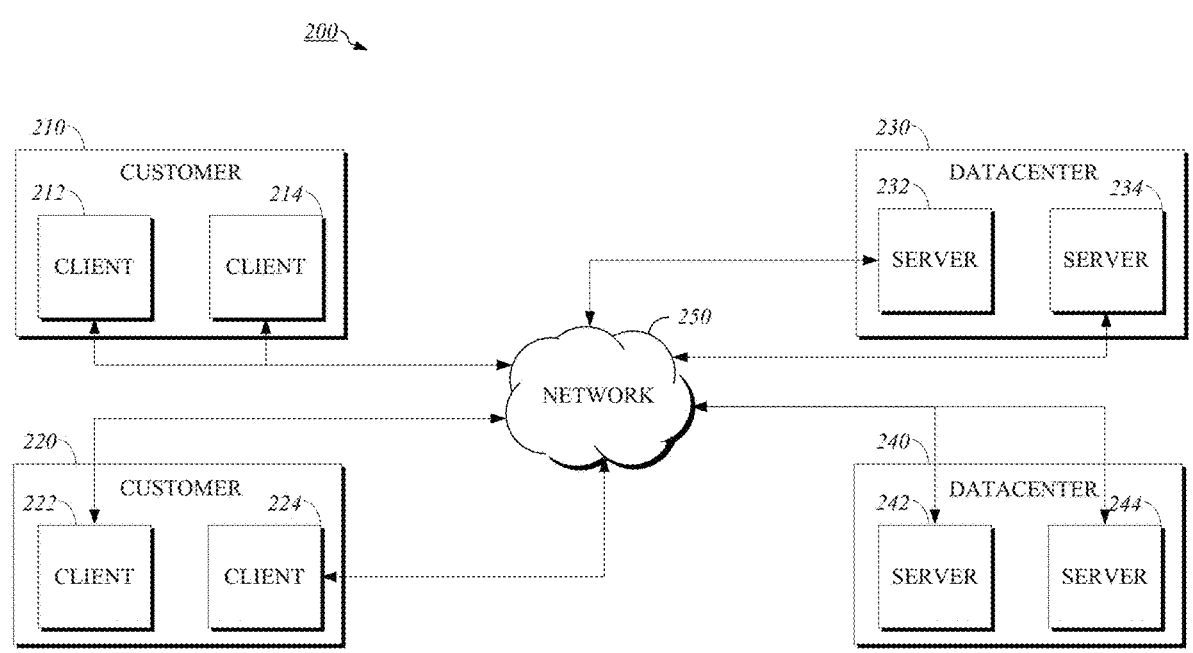
FIG. 2 is a block diagram of an implementation of a cloud computing system usable with implementations of the computing network.

FIG. 2 is a block diagram of an implementation of a cloud computing system usable with implementations of computing network 100. Cloud computing system 200 includes two customers 210, 220, although a greater number of customers may be contemplated. The customer may have clients, such as clients 212, 214 for customer 210 and clients 222, 224 for customer 220. Clients 212, 214, 222, 224 may be in the form of a computing system including multiple computing devices, or in the form of a single computing device, for example, a mobile phone, a tablet computer, a laptop computer, a notebook computer, a desktop computer, a server computer, and the like. The customers and clients are shown as examples, and a cloud computing system such as cloud computing system 200 may have a different number of customers or clients or may have a different configuration of customers or clients. For example, there may be hundreds or thousands of customers and each customer may have any number of clients. Clients 212, 214, 222, 224 may be, for example, clients 108, 110, 112 or other client computers included within computing network 100.

Cloud computing system 200 includes datacenters 230, 240. The datacenters include servers, such as servers 232, 234 for datacenter 230 and servers 242, 244 for datacenter 140. Each datacenter may represent a different location where servers are located, such as a datacenter facility in San Jose, Calif. or Amsterdam, the Netherlands. Servers 232, 234, 242, 244 may be in the form of a computing system including multiple computing devices, or in the form of a single computing device, for example, a desktop computer, a server computer, mainframe computer, computer workstation, and the like. The datacenters and servers are shown as examples, and the cloud computing system 200 may have a different number of datacenters and servers or may have a different configuration of datacenters and servers. For example, there may be tens of data centers and each data center may have hundreds or any number of servers. Servers 232, 234, 242, 244 may be, for example, servers 102, 104, 106 or other servers operative within computing network 100.

Clients 212, 214, 222, 224 and servers 232, 234, 242, 244 are connected to network 250. The clients for a particular customer may connect to network 250 via a common connection point or different connection points. Network 250 may, for example, be or include the public Internet. Network 250 may also be or include a local area network, wide area network, virtual private network, or any other means of transferring data between any of clients 212, 214, 222, 224 and servers 232, 234, 242, 244. Network 250, datacenters 230, 240, and/or blocks not shown may include network hardware such as routers, switches, load balancers, and/or other network devices. For example, each of datacenters 230, 240 may have one or more load balancers (not shown) for routing traffic from network 250 to one or more servers such as servers 232, 234, 242, 244. Network 250 may be, for example, link 114 or other telecommunications systems usable by computing network 100.

Other implementations of cloud computing system 200 are also possible. For example, devices other than the clients and servers shown may be included in the system. In an implementation, one or more additional servers may operate as a cloud infrastructure control, from which servers and/or clients of the cloud infrastructure are monitored, controlled, and/or configured. For example, some or all of the techniques described herein may operate on said cloud infrastructure control servers. Alternatively, or in addition, some or all of the techniques described herein may operate on servers such as servers 232, 234, 242, 244.

The data processing components of this disclosure, including computing network 100 of FIG. 1 and cloud computing system 200 of FIG. 2, may be implemented by various hardware devices. The makeup of these subcomponents is described in greater detail below, with reference to FIGS. 3 and 4.

Figure 3:
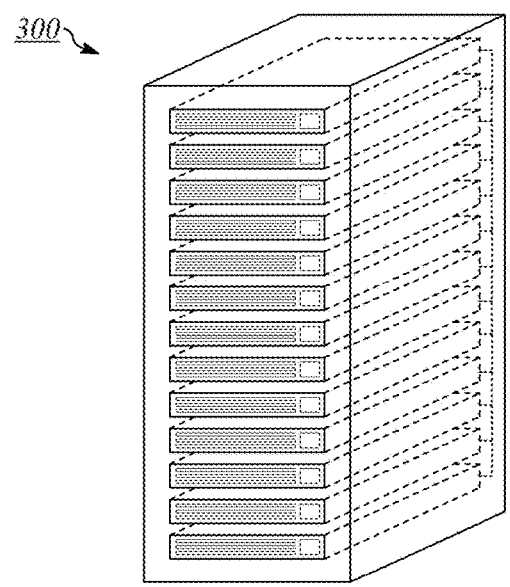
FIG. 3 is a perspective view of an implementation of a storage enclosure for housing computing equipment usable within implementations of the computing network.

FIG. 3 is a perspective view of an implementation of a storage enclosure for housing computing equipment usable within implementations of computing network 100. FIG. 3 shows a storage enclosure 300 housing computer servers, such as one or more of servers 102, 104, 106 (and/or 232, 234, 242, 244, to the extent different). One implementation of this structure includes a computer hardware rack or other storage enclosure, frame, or mounting that houses rack mounted servers. In this example, the computer servers include their own power supplies and network connections. Another implementation includes a blade enclosure containing blade servers. The blade enclosure includes power supplies, cooling units, and networking components shared by the constituent blade servers. A control center (not shown) may be included to supervise or manage operations of the racked computer servers.

Figure 4:
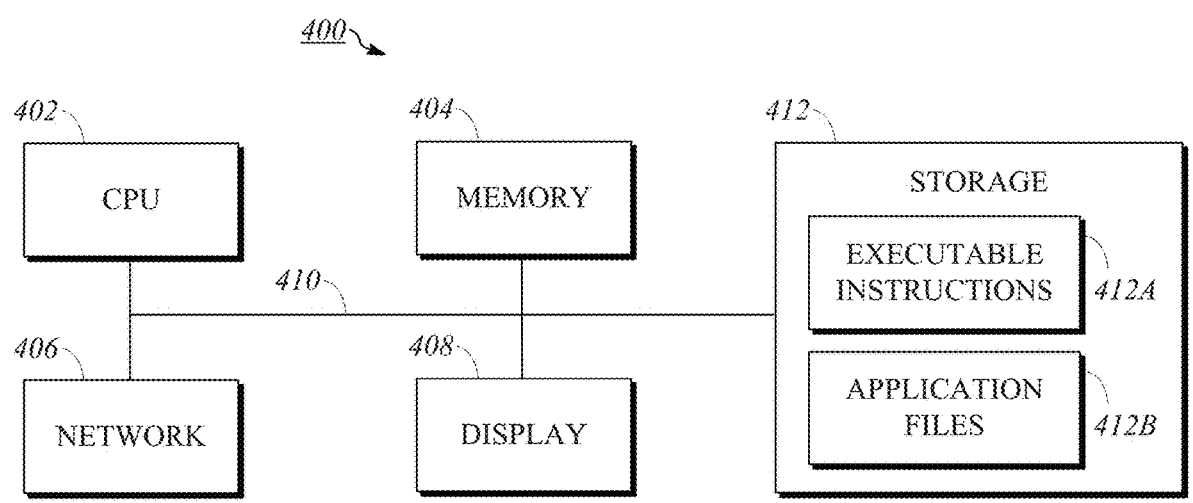
FIG. 4 is a block diagram of an implementation of a digital data processing machine usable within implementations of the computing network.

FIG. 4 is a block diagram of an implementation of a digital data processing machine usable within implementations of computing network 100. Machine 400 may be implemented by one or more computing devices such as a mobile telephone, a tablet computer, laptop computer, notebook computer, desktop computer, server computer, mainframe computer, computer workstation, and the like.

In an implementation, machine 400 includes CPU 402, memory 404, storage 412, network 406, display 408, and bus 410. One example of CPU 402 is a conventional central processing unit. CPU 402 may include single or multiple processors each having single or multiple processing cores. Alternatively, CPU 402 may include another type of device, or multiple devices, capable of manipulating or processing information now-existing or hereafter developed.

Memory 404 may comprise RAM or any other suitable type of storage device. The memory 404 may include executable instructions and data for immediate access by CPU 402. Memory 404 may include one or more DRAM modules such as DDR SDRAM. Alternatively, memory 404 may include another type of device, or multiple devices, capable of storing data for processing by CPU 402 now-existing or hereafter developed. CPU 402 may access and manipulate data in memory 404 via bus 410.

Storage 412 may include executable instructions 412A and application files 412B along with other data. Executable instructions 412A may include, for example, an operating system and one or more application programs for loading in whole or part into memory 304 and to be executed by CPU 402. The operating system may be, for example, Windows, Mac OS X, Linux, or another operating system suitable to the details of this disclosure. The application programs may include, for example, a web browser, web server, database server, and other such programs. Some examples of application files 412B include client/user files, database catalogs, and configuration information. Storage 412 may comprise one or multiple devices and may utilize one or more types of storage, such as solid state or magnetic.

The internal configuration may also include one or more input/output devices, such as network 406 and display 408. Network 406 and display 408 may be coupled to CPU 402 via bus 410, in one example. Network 406 may, for example, include a network interface and may take the form of a wired network interface such as Ethernet or a wireless network interface. Other output devices that permit a client/user to program or otherwise use the client or server may be included in addition to or as an alternative to display 408. When the output device is or includes a display, the display may be implemented in various ways, including by a LCD, CRT, LED, OLED, etc.

Other implementations of the internal architecture of clients and servers are also possible. For example, servers may omit display 408 as well as client programs such as web browsers. Operations of CPU 402 may be distributed across multiple machines which may be coupled directly or across a local area or other network. Memory 404 and/or storage 412 may be distributed across multiple machines such as network-based memory or memory in multiple machines performing the operations of clients or servers. Although depicted here as a single bus, bus 410 may be composed of multiple buses.

Various instances of digital data storage may be used to provide storage internal and/or external to the components previously described and illustrated. Depending upon its application, such digital data storage may be used for various functions, such as storing data and/or storing machine-readable instructions. These instructions may themselves support various processing functions, or they may serve to install a software program upon a computer, where such software program is thereafter executable to perform other processing functions related to this disclosure.

In any case, the storage media may be implemented by nearly any mechanism to digitally store machine-readable signals. One example is optical storage such as CD-ROM, WORM, DVD, digital optical tape, disk storage, or other optical storage. Another example is direct access storage, such as a conventional "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

In an implementation, a storage medium can be coupled to a processor so the processor may read information from, and write information to, the storage medium. In the alternative, the storage medium may be integral to the processor. In another example, the processor and the storage medium may reside in an ASIC or other integrated circuit.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like.

More particularly, one or more clients or servers or other machines described herein may include an ASIC or programmable logic array such as a FPGA configured as a special-purpose processor to perform one or more of the operations or steps described or claimed herein. An exemplary FPGA may include a collection of logic blocks and RAM blocks that may be individually configured and/or configurably interconnected in order to cause the FPGA to perform certain functions. Certain FPGAs may contain other general or special purpose blocks as well. An exemplary FPGA may be programmed based on a hardware definition language (HDL) design, such as VHSIC Hardware Description Language or Verilog.

Figure 5:
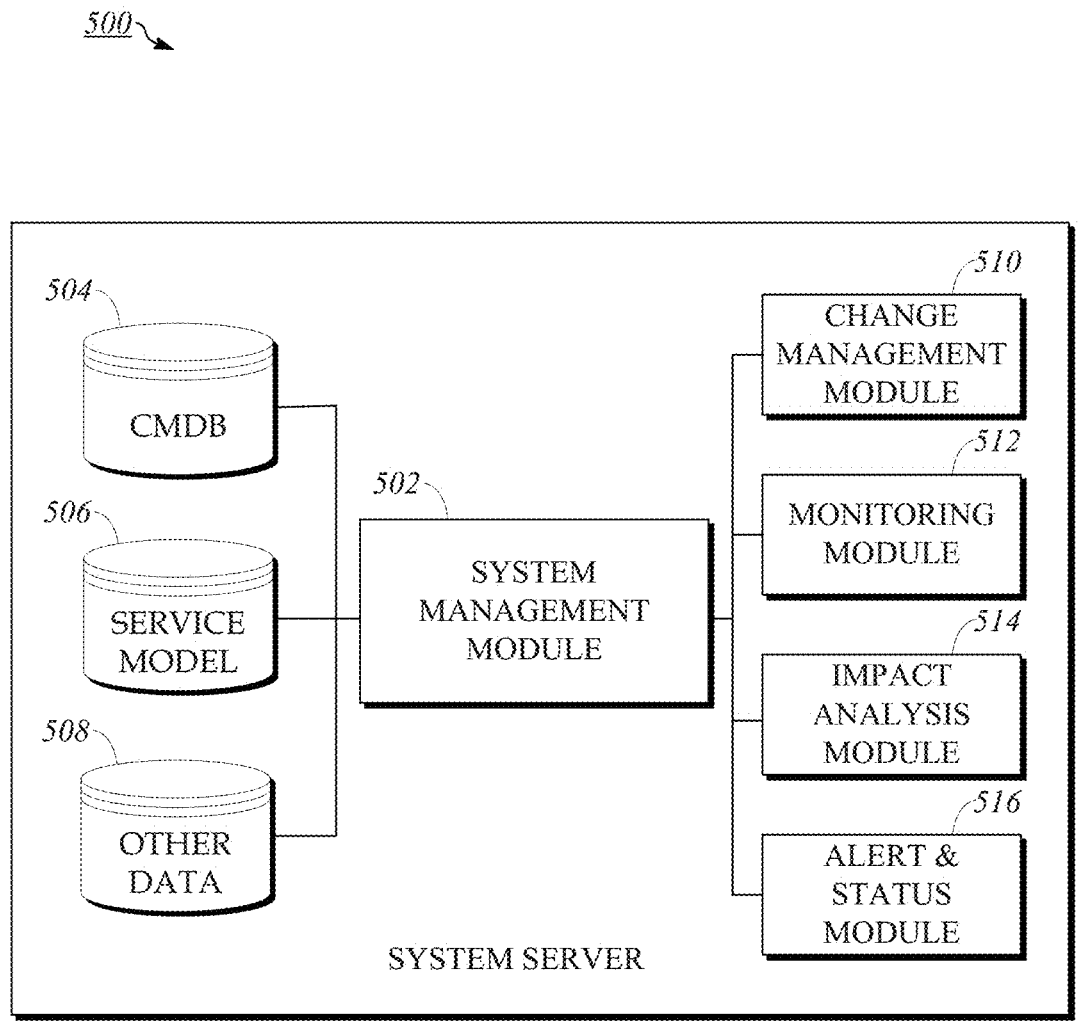
FIG. 5 is a block diagram of an implementation of a system server usable within implementations of the computing network.

Certain operational aspects of the disclosure will now be described with reference to FIGS. 5 through 12. FIG. 5 is a block diagram of an implementation of a system server 500, such as system server 116, usable within implementations of computing network 100. System server 500 may be a machine, such as machine 400, or server instance operable on a machine 400. In an implementation, system server 500 can be or can be included as part of one or more servers in one or more datacenters, such as one of servers 232, 234 of datacenter 230. In an implementation, system server 500 also or instead can be or can be included within a separate server not used for facilitating client requests.

System server 500 can include system management module 502, which monitors and processes alerts indicative of conditions of a customer infrastructure (e.g., customers 210, 220) of computing network 100. In an implementation, system management module 502 comprises instructions for performing or otherwise performs impact calculation, including, without limitation, identifying alerts applicable to a customer infrastructure, identifying resources of the customer infrastructure affected by the identified alerts, and determining the effects of the identified alerts on the identified resources. As described above, impact calculation can be performed to identify the magnitude of an effect, or severity, of identified alerts on applicable nodes of the customer infrastructure. As an alert is identified, various factors are considered to calculate severity, for example, impact rules, the number of related active alerts, a past history of affected nodes, relationships between nodes of the service model, and the resource represented by the node. The severity can then be indicated with respect to a node hierarchy, discussed below with respect to FIG. 9, and/or an impact tree, discussed below with respect to FIG. 10.

In an implementation, system server 500 comprises data used for performing impact calculation. For example, system server 500 may include one or more of CMDB 504, service model 506, and other data 508. CMDB 504 is a configuration management database comprising data representative of the nodes of a customer infrastructure (e.g., customers 210, 220) of computing network 100 and the relationships between the nodes. Service model 506 is a collection of nodes associated with a particular customer service environment (e.g., a configuration of deployed services of computing network 100). In an implementation, service model 506 can be populated, for example, by a discovery tool as discussed below with respect to FIG. 6. In an implementation, service model 506 stores information indicative of the nodes associated with the corresponding service environment for later use, for example, in performing impact calculation. Other data 508 may be used for storing any other data associated with computing network 100, including without limitation other data as may be useful for performing impact calculation. In an implementation, other data 508 may be represented by CMDB 504 and service model 506. In an implementation, CMDB 504, service model 506, and other data 508 are comprised within a single storage component.

In an implementation, system server 500 can include various modules operable with system management module 502 for facilitating impact calculation. For example, in an implementation, system server 500 also includes change management module 510, which can be operable with system management module 502 to provide a graphical user interface (GUI) representing client-requested changes to the default nodes and relationships of CMDB 504 and/or service model 506, as applicable. Change management module 510 can also be configured to receive client-submitted notifications of planned maintenance operations affecting computing network 100. Change management module 510 may store records of planned maintenance operations in storage, for example, other data 508. In an implementation, this data may be stored as part of CMDB 504 and/or service model 506, as applicable.

In an implementation, system server 500 also includes one or more of monitoring module 512, impact analysis module 514, and alert & status module 516, operable with system management module 502. Monitoring module 512 monitors computing network 100 to identify functionally impaired resources. Impact analysis module 514 analyzes the relationship, if any, between functional impairments and planned maintenance operations. Responsive to receiving advance notification of newly planned maintenance, impact analysis module 514 may provide further services of consulting historical records from storage and formulating predictions as to future functional impairment likely to occur as a consequence of the newly planned maintenance. Alert & status module 516 outputs various notifications corresponding to functionally impaired nodes of CMDB 504. Modules 510, 512, 514, 516 may store records of functional impairment and causal relationships as well as records of any other relevant data that is found, prepared, computed, or received by modules 510, 512, 514, 516. For example, other data 508 may be used to store such data.

In addition to modules 510, 512, 514, 516, system server 500 may include, and system management module 502 may be operable with, various other tools, modules, systems, or other functionality (not shown) for use in supporting a customer infrastructure, such as the discovery tool discussed below with respect to FIG. 6. For example, in an implementation, system server 500 includes client interface tools (not shown) operable to provide graphical views of complex information technology (IT) infrastructure and service relationships to client computers on computing network 100. These client interface tools provide output by which IT professionals can click through data maps, filter data, focus in on specific nodes, and view impact and risk alongside in-flight operational activities such as incident, problem, change requests, and default or user-extended rules for the nodes. The client interface tools further provide a simple and flexible reporting engine, which provides an output including dashboards and reports, which may be scheduled to be distributed on a regular basis. The client interface tools provide administrators, system owners, and service owners with data to quickly identify configuration drift, unplanned changes, and incident history to understand the health of nodes they are responsible for and the operational activities directly or indirectly impacting those nodes.

Modules 510, 512, 514, 516 are provided for illustrative purposes only to identify implementations of the functionality of system server 500 and system management module 502. As such, other implementations of system server 500 and/or system management module 502 may accomplish the same or similar functions of those components, for example, wherein the same or similar functionality discussed with respect to modules 510, 512, 514, 516 is included within any number of modules, tools, or systems.

Figure 6:
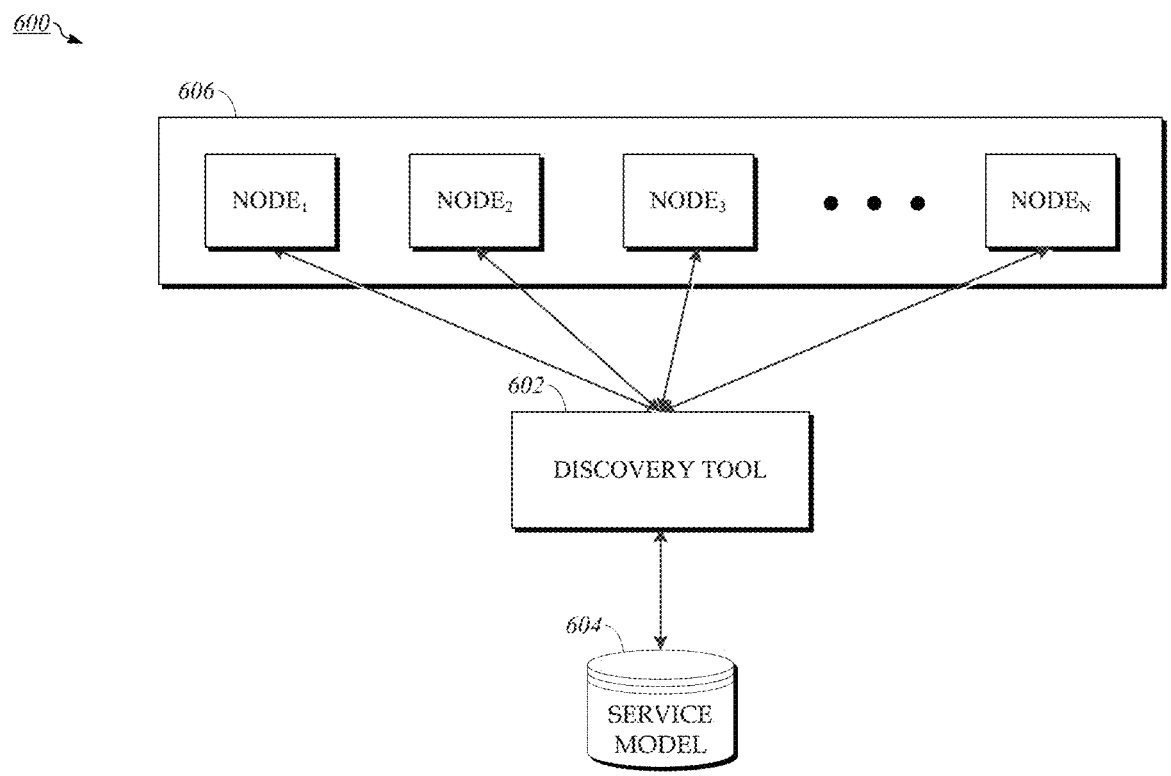
FIG. 6 is a block diagram of an implementation of a logic flow for data indicative of nodes of a configuration management database.

FIG. 6 is a block diagram 600 of an implementation of a logic flow for data indicative of nodes of a CMDB 606. In an implementation, CMDB 606, which may, for example, be CMDB 504, can be populated by client submissions including web service imports, direct database imports, and spreadsheet file imports. In an implementation, CMDB 606 may also or instead be populated via automated discovery and other methods conducted by or through system management module 502. For example, with auto discovery, discovery tool 602 performs a discovery process to locate resources used by a customer infrastructure for delivering services as part of service model 604. In an implementation, NODE' through NODEN represent hardware or software resources within a customer infrastructure.

In an implementation, discovery tool 602 can be installed within computing network 100, for example, as part of system server 500 operable with system management module 502. Discovery tool 602 can collect information about the resources associated with a customer infrastructure, including the hardware and software resources associated with a service model of the infrastructure and the relationships between those resources, which relationships can be based on the default and/or user-modified impact rules, as applicable. Discovery tool 602 can populate service model 604 based on the collected information.

Node data may be stored within a database, such as CMDB 606. The nodes may be populated in CMDB 606 in a number of ways. In an implementation, discovery tool 602 collects information about nodes within CMDB 606 or to be added to CMDB 606 via auto-discovery, which may be performed periodically and/or in response to a user- or system-initiated event, for example, changes made to the impact rules or node hierarchy. In an implementation, discovery tool 602 can be implemented within a datacenter, such as by installation on one or more of servers 232, 234 within datacenter 230, or on a separate cloud infrastructure control server. In an implementation, discovery tool 602 can be installed within a customer infrastructure, for example, on one or more servers within customers 210, 220. In an implementation, service model 604 can maintain a record of previous results of auto-discovery. In an implementation, node data may be imported into service model 604 by integrating service model 604 with a CMDB including but not limited to CMDB 606. Importing information about the nodes for populating CMDB 606 from an external source may be done through an import of information in a standard file format such as XML or CSV, which may then be transformed into appropriate tables and records in service model 604.

In an implementation, auto discovery may be performed in a top-down fashion. When discovery is performed top-down, an entry point can first be specified indicating how a service is consumed, for example, via a web service. In an implementation, an entry point can be a host, protocol, port, URL, or other set of parameters that indicates a location of a resource of the computer network. The entry point can be analyzed to identify one or more nodes to which various probes can be sent to obtain additional information. These probes can be configured to identify other nodes related by default to the initially discovered nodes as well as relationships for the nodes associated with applicable default impact rules. This process can be performed iteratively until no further nodes or relationships are discovered. Discovery tool 602 may further check such data for errors, normalize and transform the data, and load the data to capture the most recent and accurate profiles of the nodes.

In an implementation, in addition to top-down auto discovery, discovery tool 602 performs horizontal auto discovery by detecting nodes related to a given service model. For example, discovery tool 602 may identify nodes representing resources of other service models that have an effect on an impact calculation for one or more nodes of the given service model. In an implementation, discovery tool 602 includes instructions for performing horizontal auto discovery. In an implementation, horizontal auto discovery can be used to identify nodes that are not included as part of a service model, but which are associated with the operation of the service model as a whole or individual nodes of the service model. For example, using horizontal auto discovery, nodes used by a server to operate the service model, such as routers, switches, and the like, may be identified for impact calculation. In an implementation, discovery tool 602 performs horizontal auto discovery based on user-configured impact rules, for example, indicating that a node not part of the service model effects the impact calculation for one or more nodes of the service model. For example, discovery tool 602 may identify nodes to be associated with service model 604 based on impact rules for defining resource relationships between various hardware and hardware, software and software, and hardware and software resources of the customer infrastructure.

Vertical and horizontal discovery can be used to identify the nodes associated with resources of a service model. In an implementation, an entry point into the CMDB can be identified, for example, based on a URL entered by a user. Using the entry point, vertical discovery can be performed to identify the applicative resources involved in delivering the service related to the URL. Horizontal discovery can then be performed based on the identified applicative resources to identify the infrastructure resources that execute the applicative resources. Further vertical discovery can occur with respect to the identified infrastructure resources, and further horizontal discovery can occur with respect to further identified applicative resources, until the nodes for all resources related to the service have been discovered. In an implementation, vertical and/or horizontal discovery can occur with prior knowledge of applicative and/or infrastructure resource nodes, for example, where same were discovered during a previous discovery operation. Implementations and examples of vertical and horizontal discovery of a service model using an entry point are described in issued U.S. Pat. No. 9,215,270 by inventors Shai Mohaban, Haviv Rosh, Yarin Benado, and Yuval Cohen entitled "System and Method for Determining a Topology of At Least One Application in a Computerized Organization," filed Aug. 20, 2013, the disclosure of which is incorporated herein by reference.

Figure 7:
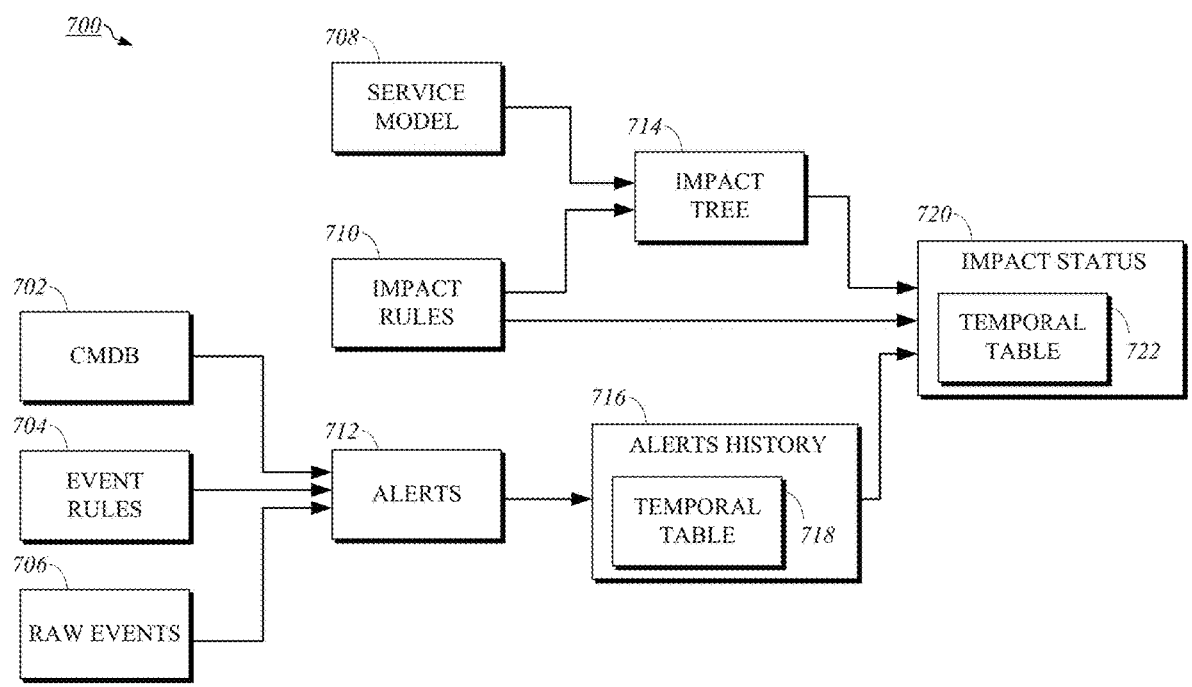
FIG. 7 is a block diagram of an implementation of a logic flow amongst components of a system server.

FIG. 7 is a block diagram 700 of an implementation of a logic flow amongst components of a system server, such as system server 500. In an implementation, diagram 700 can represent a scheduled worker for periodically or non-periodically monitoring for alerts and processing same by performing impact calculation.

In an implementation, alerts indicative of conditions of a customer infrastructure are processed based on service model 708, impact rules 710, and alerts 712. Service model 708 is a collection of nodes representative of at least a portion of a customer infrastructure. In an implementation, service model 708 can be identified by a discovery process, such as that discussed above with respect to FIG. 6. Service model 708 may be manually configured to include additional nodes not identified as associated with the subject customer service environment. The service model may be considered as a collection of related nodes, along with their relationships/dependencies as determined based on the default and/or user-modified impact rules. Services within a customer infrastructure can be formed of multiple layers like the customer instance described above. In a further example, a service may be composed of a web tier, an application tier, a cache tier and a storage tier that are grouped into individual clusters of multiple hosts/machines, also referred to as nodes. The tiers can have defined roles within the service.

In an implementation, impact calculation further includes considering nodes that are connected to, but are not necessarily a part of, a given service model, which connections may be referred to as infrastructure relationships. For example, infrastructure relationships may be indicative of alert impact between related hardware and software resources, various cluster types, or various virtual machine types or connectivity, such as where one corresponding resource is included in the service model. When it is determined that a received alert affects a node under an infrastructure relationship, that node may be included within the impact tree for the corresponding impact calculation and/or represented within the node hierarchy. A user may create infrastructure relationships by defining fields related to applicable child nodes, parent nodes, impact rules, and impact direction.

Impact rules 710 are instructions for processing identified alerts relative to the nodes of the service model. In an implementation, impact rules 710 can be default impact rules established, defined, or otherwise applied to nodes of service model 708; however, impact rules 710 may also or instead be manually configured, for example, by modifying elements of the default impact rules, adding new impact rules customized by the user, and/or removing default or customized impact rules. In an implementation, impact tree 714 can be a hierarchical tree indicative of dependency relationships between nodes of a service model as defined by impact rules and can therefore be generated based on service model 708 and impact rules 710. For example, impact tree 714 can comprise multiple tiers, wherein a first tier can represent nodes not dependent upon any other nodes and following tiers can represent nodes depending from nodes of a preceding tier. Thus, impact tree 714 can be indicative of the dependency relationships between nodes of service model 708, which dependency relationships are a basis for generating a corresponding node hierarchy. Implementations of node hierarchies and impact trees are discussed below with respect to FIGS. 9 and 10, respectively.

Alerts 712 indicate potential impairment of nodes associated with a given service model. In an implementation, alerts 712 are identified based on CMDB 702, event rules 704, and/or raw events 706. CMDB 702 is a configuration management database, such as CMDB 504, and includes data representative of nodes of multiple service models within a customer infrastructure. Event rules 704 are rules instructive for how and when alerts are received and processed. In an implementation, event rules 704 define how often alerts should be searched for, for example, by system management module 502, or how often identified alerts should be processed. Raw events 706 refers to information received regarding one or more resources of the customer infrastructure, for example, external to the customer infrastructure (e.g., from a third party service provider). In an implementation, raw events 706 includes identifying a request made for receiving or processing alerts, for example, using an application program interface (API), such as a representational state transfer API.

In an implementation, alerts can indicate a physical condition of a node. For example, a server can include a temperature sensor that measures the temperature of, for example, one or more CPUs, memory, or storage. The measurement can be collected, such as directly by, e.g., system server 500.

In an implementation, identified alerts are processed using alerts history 716, which may be a table, cache, or other temporary storage for data indicative of the alerts. In an implementation, alerts history may comprise temporal table 718 for maintaining temporal data associated with identified alerts. For example, alerts identified by system management module 502 may be temporarily stored in temporal table 718 of alerts history 716 based on the time they are identified, for example, using a timestamp recorded at the time of identification. Based on event rules 704 and/or other instructions included within and/or provided to system management module 502, temporal table 718 may be configured to communicate identified alert data at only predetermined or modifiable time intervals. In this way, alerts history 716 may store the identified alerts in a temporary storage until the next time interval is reached, at which time any data stored in temporal table 718 can be processed.

Impact status 720 can be a structure, such as a table, for indicating information about impact calculated for nodes identified by impact tree 714 (and a corresponding node hierarchy) via service model 708. An example of an impact status table is discussed in further detail below. In an implementation, in response to receiving data from impact tree 714 and alerts history 716, impact status 720 indicates the results of impact calculation performed for nodes of service model 708 based on how alerts 712 are applied to impact rules 710. For example, impact status 720 may display data representative of applicable alerts indicative of an overall degree to which the alerts affect service model 708 and/or data representative of applicable nodes indicative of an overall degree to which those nodes are affected by alerts 712. As with alerts history 716, in an implementation, impact status 720 may comprise a temporal table 722 for maintaining temporal data associated with impact status data. For example, the results of a performed impact calculation may be temporarily stored in temporal table 722 of impact status 720 based on the time they are processed, for example, using a timestamp recorded at the time of processing. Based on event rules 704 and/or other instructions included within and/or provided to system management module 502, temporal table 722 may be configured to display processed impact calculation data at only predetermined or modified intervals or upon the occurrence of some event, for example, identifying a change to one of the severity for a node or the node hierarchy. In this way, impact status 720 may store the processed impact calculation data in a temporary storage until the next time interval has been reached or event has occurred, at which time the data stored in temporal table 722 can be indicated (e.g., as output to a display).

Figure 8:
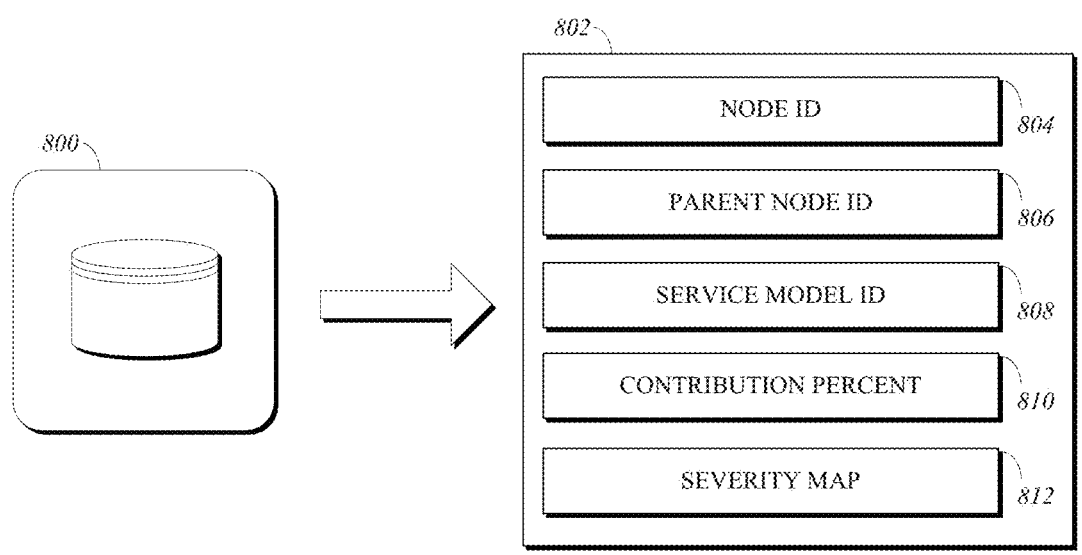
FIG. 8 is a diagram of an implementation of data associated with a node of the node hierarchy.

FIG. 8 is a diagram of an implementation of data 802 associated with a node 800 of a node hierarchy. As discussed above, node 800 represents a resource associated with a service model of a customer infrastructure (e.g., customers 210, 220). Data 802 may include any data useful for identifying node 800 and calculating impact for node 800 and other nodes depending from node 800. In an implementation, data 802 comprises node identifier 804, parent node identifier 806, service model identifier 808, contribution percent 810, and severity map 812.

Node identifier 804 can be a character or set of characters for identifying the resource represented by node 800. For example, node identifier 804 may be a number that, when referenced in an index or other list, indicates an association to the subject resource. In an implementation, node identifier 804 can be a unique character string or integer assigned to represent the resource represented by node 800. In an implementation, node identifier 804 can be assigned based on one or more characteristics shared by node 800 and other nodes, for example, nodes connected within a service model to node 800. In an implementation, node 800 can be represented by the same node identifier 804 regardless of the service model presently considered for impact calculation. In an implementation, node 800 may be represented by different node identifiers 804 in each service model with which it is associated. Parent node identifier 806 can be a node identifier (as described above with respect to element 804) associated with a parent of node 800. As previously discussed, a parent node is a node from which a current node, such as node 800, depends, and thus that can be affected by a change in severity of node 800. Service model identifier 808 can be an identifier similar to node identifier 804 and parent identifier 806, but representative of a service model.

Contribution percent 810 can represent a degree to which a severity of node 800 affects a severity of a parent node, for example, the parent node identified by parent node identifier 806. In an implementation, node 800 may have multiple parent nodes, and thus contribution percent 810 may apply to each of them. In an implementation, contribution percent 810 can be based on the resource represented by node 800 and/or other resources associated with nodes connected to node 800. For example, where node 800 represents a resource in a cluster of five resources and the severity of the cluster can be changed where the severity for three of those resources has changed based on an alert, contribution percent 810 is 33%. Although contribution percent 810 is expressed as a percentage value, it can instead be expressed in any other unit suitable for conveying portions.

Severity map 812 can be a map indicative of the effect of a severity from node 800 as a child node to a corresponding parent node, such as the parent node identified by parent node identifier 806. Severity map 812 may be particularly useful based on the nature of the relationship between node 800 and its parent node. For example, where a network path is identified between node 800 and its parent node, an alert listed as "CRITICAL" on a redundant network element may be considered only "MAJOR" for the network path in that redundancy allows communication to continue on that path.

Although data 802 is illustrated as being associated with node 800, data 802 may be associated with any node of the node hierarchy. While data 802 is shown as including data items 804, 806, 808, 810, and 812, other data elements not shown or herein disclosed may also be associated with a given node of the node hierarchy. Similarly, it may be the case that not the data associated with a given node of the node hierarchy does not include one or more of the data items shown or that it includes data elements not shown and exclude data elements that are shown. However, each node of the node hierarchy is associated with at least some data elements.

Figure 9:
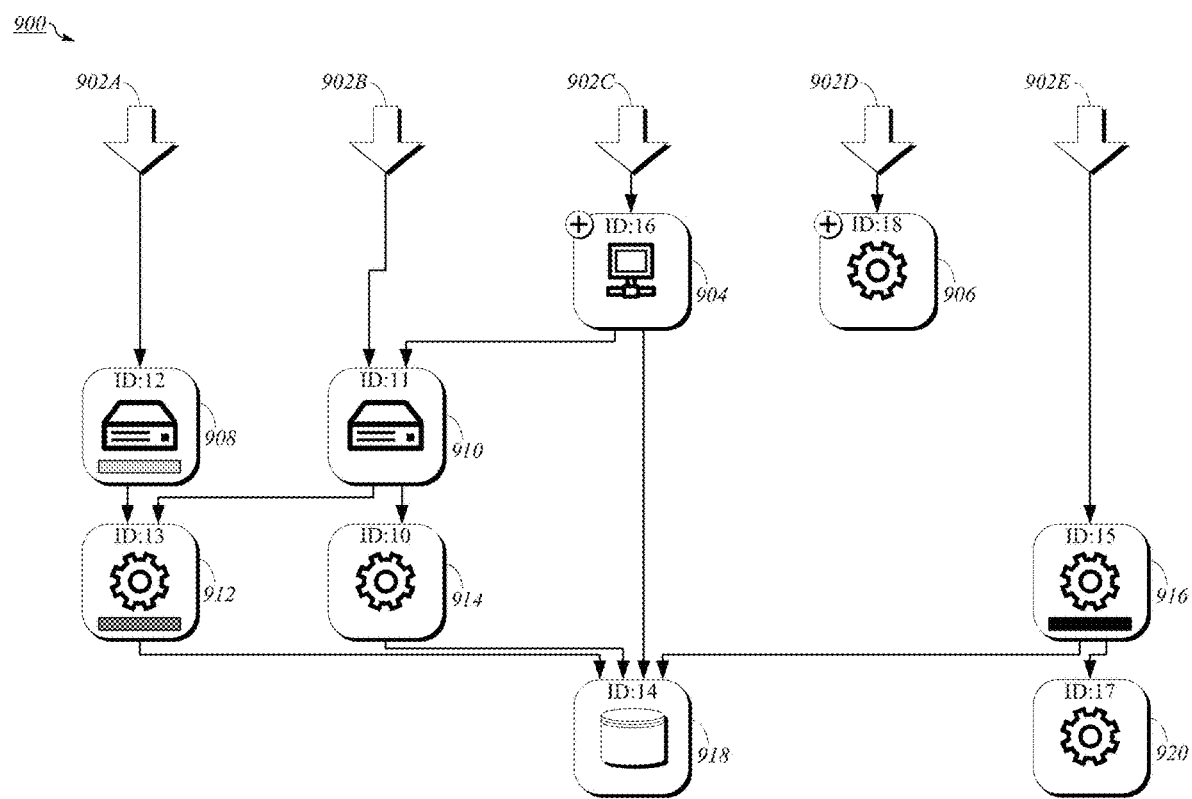
FIG. 9 is an illustration of an implementation of a node hierarchy representative of resources of a service model.

FIG. 9 is an illustration of an implementation of a node hierarchy 900 representative of resources associated with a service model. As previously discussed, node hierarchy 900 comprises nodes representative of resources associated with a service model of a customer infrastructure, which nodes are connected by edges representative of the relationships between the corresponding resources. For example, a relationship may represent dependency of a one node by another (e.g., a parent node being dependent upon a child node). Thus, in an implementation, a relationship may be indicative of a contribution vector for calculating impact of a parent node.

Node hierarchy 900 can be generated by applying impact rules to nodes associated with a service model. In an implementation, resources represented by the nodes comprising node hierarchy 900 may natively be included in a subject service model, a different service model, or multiple service models. In this way, resources shared by various service models or related to resources native to a subject service model may, for example, be associated with the subject service model and included nodes of node hierarchy 900. In an implementation, node hierarchy 900 may be updated upon a change being identified with respect to the underlying topology of the subject service model (e.g., as a result of vertical discovery, such as where a node has been moved within, added to, or removed from the topology), the infrastructure topology related to resources of the subject service model (e.g., as a result of horizontal discovery, such as where an infrastructure resource corresponding to an applicative resource within the service model is identified), or applicable impact rules (e.g., as a result of identifying changes made to node hierarchy 900 or changing the strategy for connecting nodes of node hierarchy 900). In an implementation, only the portions of node hierarchy 900 affected by a change are updated, for example, in order to preserve time and system processing power.

In an implementation, node hierarchy 900 can be a directional map of nodes representing resources associated with a service model of a customer infrastructure. An entry point into node hierarchy 900, such as entry points 902A, 902B, 902C, 902D, 902E, can represent a flow of or path for data processing with respect to the nodes of node hierarchy 900, for example, by indicating a first resource associated with the service model to process a request by the service model. The directional paths of node hierarchy 900 can flow from nodes at a lowest level of node hierarchy 900 up to a corresponding entry point and are indicative of dependency relationships between the nodes. For example, arrows pointing from a first node, such as node 904, to a second node, such as node 910, indicate that the second node depends from the first node and thus that a severity of the second node may contribute to the severity of the first node. Nodes that depend from other nodes are referred to as child nodes and the nodes from which child depend are referred to as parent nodes. Defining these relationships can be useful, for example, for performing impact calculation on parent nodes based on impact values calculated for corresponding child nodes.

In an implementation, and as shown in the figure, node hierarchy 900 comprises nodes 904, 906, 908, 910, 912, 914, 916, 918, 920. Node 904 represents a network resource, for example, Ethernet switches, a network router, a load balancer, etc. Nodes 906, 912, 914, 916, 920 represent software resources, for example, web-based applications operable on a Java Virtual Machine, interface software for use with a database, firmware for operating a connected hardware resource, Javascript for configuring platform software, etc. Nodes 908 and 910 represent storage resources, for example, network attached storage, direct-attached storage, backup and/or recovery servers, etc. Node 914 represents a database resource, for example, for storing information usable in connection with a web-based application or platform. The foregoing examples, including the specific resources listed and connections described, express or implied, are non-limiting.

In an implementation, only some of the nodes of node hierarchy 900 are included by default within the underlying topology of the subject service model. For example, a service model for executing web-based platform software may by default only include resources corresponding to nodes 906, 912, 914, 916, 918. Thus, various instructions for interacting with the platform software and processing requests for data stored in a database used by the platform may comprise the underlying topology. In an implementation, a discovery process may be used to identify resources corresponding to those of nodes 906, 912, 914, 916, 918. For example, horizontal discovery may probe service models or other aspects of a CMDB for instances of a default resource of the subject service model to identify related resources represented by nodes 904, 908, 910, 920. In an implementation, nodes 904, 908, 910, 920 are identified because it is determined that the severity of those nodes affects the severity of at least one node already included within the service model. For example, database interface software of node 914 may not be able to function properly if the device upon which its instructions are stored, node 910, is undergoing planned maintenance. Thus, to fully monitor the health and status of the service model, node hierarchy 900 can also include node 910.

In an implementation, node hierarchy 900 may be graphically depicted using arrows representing dependency relationships to connect tiles representing resources of the subject service model. As used herein, the term "tiles" refers generally to an icon, label, tag, or other designator of a resource, regardless of aesthetic characteristics such as shape, size, color, border, etc. In an implementation, a tile can include an indication of the respective node's identifier. For example, and as shown in the figure, the tile may include "ID:N" where N indicates a unique or shared identifier used to identify the node. In an implementation, tiles representing nodes of node hierarchy 900 may include symbols or illustrations representative of functionality of the corresponding resource. For example, tile 918 represents a database having identification number 14. Thus, tile 918 includes a depiction of a database icon. In an implementation, a depiction on a given tile may be generic based on the type of resource represented by the tile or specific based on the particular characteristics of the represented resource.

Additional features or descriptors for associated resources may be graphically depicted using tiles. In an implementation, an indication that a new alert applicable to a tile has been identified may be included. For example, the tile may display a "+" to indicate that a new alert will be processed with respect to the corresponding resource, such as shown on nodes 904, 906. In an implementation, the indication that an alert to be processed has been identified with respect to a node may be made using a flag, which may, for example, be graphically depicted on a tile, indicated in a data header pertaining to the resource, stored in a temporary table representative of nodes for which impact calculation is to be performed, etc. In an implementation, an indication of the severity associated with a resource may be included on a corresponding tile. For example, the severity may be indicated using a color-coded block located on the tile. Thus, as shown in the figure, the tiles indicate that node 912 has a higher severity than node 908, which has a higher severity than node 918.

Figure 10:
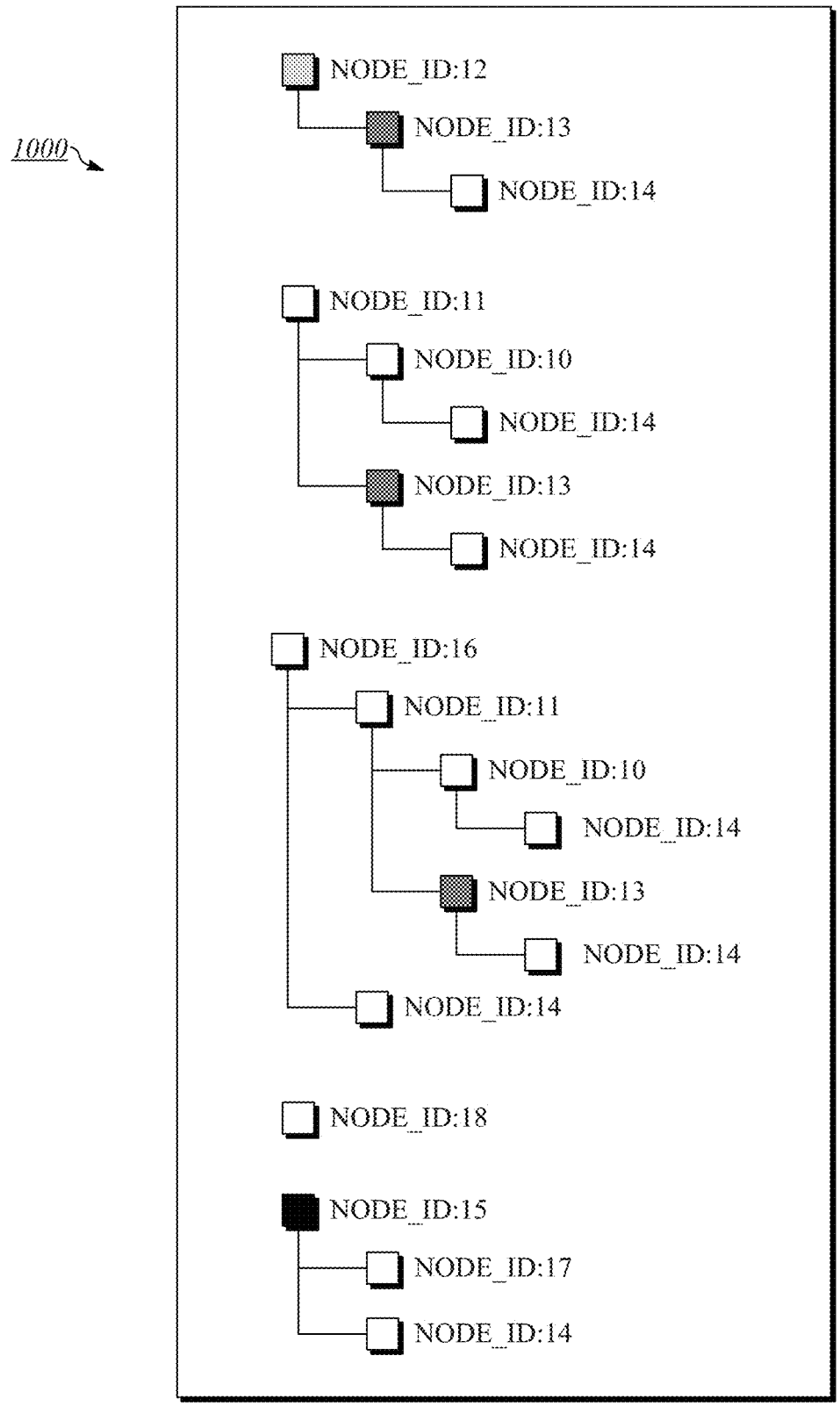
FIG. 10 is an illustration of an implementation of an impact tree representative of a hierarchy of resources associated with a node hierarchy.

FIG. 10 is an illustration of an implementation of an impact tree 1000 representative of a hierarchy of resources associated with node hierarchy 900. Impact tree 1000 can be a hierarchical tree indicative of dependency relationships between nodes of the service model of node hierarchy 900. In an implementation, a group of parent and child nodes, for example, NODE_ID:12, NODE_ID:13, and NODE_ID:14 as shown at the top of the figure, may be referred to as a "set" or "set of nodes." In an implementation, impact tree 1000 can be generated or otherwise determined based on node hierarchy 900 and an impact status table, discussed below, for example, where severity for nodes is indicated by the impact status table or another table, such as table 1200 of FIG. 12.

In an implementation, impact tree 1000 includes at a first tier parent nodes that are not dependent upon any other parent nodes of the subject service model, wherein each subsequent tier includes child nodes of the indicated parent node of the previous tier. For example, referring to the aforementioned set, NODE_ID:12 is depicted at a first tier of the set and is therefore a parent node not dependent upon any other parent nodes. NODE_ID:13 is depicted at a second tier of impact tree 1000 and NODE_ID:14 at a third tier of impact tree 1000. This is because NODE_ID:13 is a child node of NODE_ID:12, and NODE_ID:14 is a child node of NODE_ID:13. In an implementation, impact tree 1000 includes a depiction or other indication of the entry point corresponding to a given set of nodes (e.g., a URL directing a user to a resource represented by a parent node of a first tier of impact tree 1000). In an implementation, and as shown in the figure, impact tree 1000 does not include a depiction or other indication of the corresponding entry point, but depicts the beginning of a set of nodes using the parent node of the first tier of the set.

A graphical user interface representative of impact tree 1000 may be included to visually indicate the dependencies of the nodes of node hierarchy 900. In an implementation, the graphical user interface includes functionality for collapsing aspects of impact tree 1000. For example, sets of impact tree 1000 may be collapsed according to a parent node at a first tier of the set, or, in implementations wherein an entry point is included, according to the entry point. A user may selectively collapse a set of nodes of impact tree 1000, for example, by toggling an icon (not shown) located near the set. In an implementation, the graphical user interface includes an indication of a severity associated with the nodes of impact tree 1000. For example, severity may be indicated using color-coded blocks located near the nodes of impact tree 1000. Thus, as shown in the figure, NODE_ID: 13 is shown as having a higher severity than NODE_ID:12, which is shown as having a higher severity than NODE_ID: 14.

In an implementation, a user may reconfigure the node hierarchy (and thus the nodes associated with the underlying service model) by modifying impact tree 1000. For example, a user may click and drag a node of impact tree 1000 to a different set or location of impact tree 1000. In this way, NODE_ID:14 could be made a parent node of NODE_ID:13 in the topmost set shown, NODE_ID:17 could be made a child node of NODE_ID:10 in the second topmost set shown, etc. In an implementation, the user may modify impact tree 1000 by adding new nodes and/or removing existing nodes from impact tree 1000. For example, a user may switch the database represented by NODE_ID:14 with a new database represented by NODE_ID:30, or add NODE_ID:30 as a child node to parent nodes of NODE_ID: 14 to provide redundancies for that database. In an implementation, modifications made to impact tree 1000 are also shown in corresponding node hierarchy 900, which may, for example, be updated upon a modification being made or be completely re-generated.

Other information concerning the nodes of node hierarchy 900 may be included within impact tree 1000. For example, impact tree 1000 may include a description of the node, such as its resource type and/or functionality, a description about the functionality a set of nodes provides for the service model, an indication as to whether the node is at a default or modified location within impact tree 1000, etc. Further information beyond what is explicitly described above and as may be useful for understanding the relationships between nodes and the functionality of the nodes may be included in impact tree 1000, as well.

FIG. 11 is an illustration of an implementation of an alert table 1100 listing alerts for nodes of a node hierarchy. Table 1100 may be included as part of a user interface, for example, as a graphical representation output to display on a user computer. In an implementation, table 1100 is used to store and represent data processed in connection with alerts history 716 of FIG. 7. In an implementation, table 1100 can be a structural implementation of alerts history 716. In an implementation, the data stored in and represented by table 1100 can be dependent upon instructions relative to temporal table 718 of alerts history 716, for example, for determining whether or not data should be represented based on a time value.

Table 1100 comprises rows indicative of alerts identified as being associated with one or more resources of a CMDB (and, namely, with a service model) and columns representative of various fields corresponding to the data indicative or representative of the alerts. In an implementation, table 1100 organizes data for alerts into columns indicative of a number assigned to identify the alert, an initial severity associated with the alert based on its impact on applicable nodes, the node or nodes for which the alert was identified, and a timestamp indicating when the alert was identified. For example, and as shown in the figure, an alert identified at 4:42:10 PM on Nov. 2, 2015, is assigned the identification number "ALERT0010043," which may be referenced as "0010043" for short. 0010043 was identified with respect to Node_ID:13 (represented in node hierarchy 900 of FIG. 9 as a service resource associated with multiple storage infrastructure resources) and has an initial severity of "MAJOR" based on the effect of the alert on Node_ID:13.

Additional fields may also be included within table 1100. For example, table 1100 may include a "Description" column for indicating a general or detailed description of the alert being processed for a user's reference and convenience. In another example, table 1100 may include a "Source" column for indicating a source of the alert being processed. A user may consider it desirable to refer to the source for information about the alert, such as where the alert has a significant effect on the applicable service model, is one of a group of identified alerts from the same source, or the subject matter of the alert is unknown to the user. Table 1100 may further include other fields as may be deemed useful for the user.

Further, the fields described above and as may be included within table 1100 may be displayed according to a code or other defined association. For example, the values listed in the "Severity" column may be color coded according to significance (e.g., wherein red represents a highest significance and blue represents a lowest significance). In an implementation, the color represented in a field of table 1100 may be graphically indicated in a node hierarchy on the node corresponding to the alert. For example, the tile representing Node_ID:13 in a node hierarchy may include an orange color segment indicating that an alert identified relative to that node has an initial severity value of "MAJOR."

FIG. 12 is an illustration of an implementation of an impact rule table 1200 referencing the impact rules used for calculating severity of nodes of a node hierarchy based on identified alerts. As with table 1100 of FIG. 11, table 1200 may be included as part of a user interface, for example, as a graphical representation output to display on a user computer. Table 1200 comprises rows indicative of impact rules associated with nodes of a node hierarchy and columns representative of various fields corresponding to the impact rules. In an implementation, table 1200 organizes data for impact rules into columns indicative of a name of the impact rule, which may be representative of a function of the impact rule or an arbitrary name assigned, for example, by a user in configuring the impact rules. For example, an impact rule named "CONTAINMENT" may concern propagating nodes associated with, but not included in, a service model in an impact calculation for the service model, whereas an impact rule named "HOST IN CLUSTER" may instead concern how host cluster members affect an overall status of the corresponding cluster.

In an implementation, table 1200 includes a column indicative of an influence value for impact rules representing a degree to which the severities of child nodes affect the severity of a parent node under the impact rule. A threshold influence value may be used to indicate a threshold for how the severities of child nodes affect the severity of the parent node. For example, assume a threshold value for allowing child nodes to influence the parent node is 100%, and that there are four child nodes, wherein the influence of three of the child nodes is 40% and the influence of the fourth is 70%. If the severity of two of the 40% influence child nodes is "CRITICAL," but the remaining child nodes have only a "WARNING" severity or have no identifiable severity, the threshold is not met for setting the parent node severity to "CRITICAL" based on the influence (e.g., because the sum of the influence values does not meet or exceed the threshold). However, if the severity for one 40% influence child node and the 70% influence child node is "CRITICAL," the threshold is met such that the severity of the parent node may be changed to "CRITICAL" based on the influence.

In an implementation, table 1200 includes one or more columns indicating alternative impact values to use for impact rules based on a calculated severity. For example, table 1200 includes fields indicating how to change the severity for impact rules where the calculated severity is "CRITICAL," "MAJOR," "MINOR," or "WARNING." Thus, even where a severity value is calculated for a node, the impact rules (e.g., by default or as configured by a user) may nonetheless further change the severity. For example, where the severity for a node to which the impact rule "HOST IN CLUSTER" applies is calculated to be "CRITICAL," the impact rule may indicate that the severity should be changed to "MAJOR." In an implementation, the alternative impact values set for an impact rule are suggested such that a user may decide whether to apply or ignore it, or an algorithm or other process may be used to decide whether or not to apply it. In an implementation, the alternative impact values are automatically used to change a calculated severity.

Additional fields may also be included within table 1200. For example, table 1200 may include columns for defining a relationship between nodes of a node hierarchy, such as a "Connection" column for indicating one or more nodes that are connected based on a given impact rule and a "Direction" column for indicating a dependency direction between the connected nodes. In an implementation, the dependency direction for connected nodes may be implicit based on the connection (e.g., wherein it is clear that one connected node depends upon another), or it may be determined irrespective of the connection. In an implementation, table 1200 can be updated upon the severity for an included node being changed as a result of an identified alert. In an implementation, table 1200 can be updated upon the node hierarchy being re-generated or otherwise updated. In an implementation, table 1200 shows impact rules for changing a node's severity when an alert of a given severity affects it.

In an implementation, an impact status table (not shown) may be used for storing and representing impact values calculated for and related status data of nodes of the node hierarchy. For example, the impact status table may include the values used to perform impact calculation (as discussed below with respect to FIG. 15). In an implementation, status data represented in an impact status table may be used to change the data displayed in the node hierarchy and/or impact tree. For example, the color to use for representing severity of a node on a tile of the node hierarchy may be determined based on a corresponding value of the impact status table. In an implementation, the impact status table may be updated upon identifying a change in severity for any node, for example, due to an identified alert, or upon identifying an update being made to the node hierarchy, for example, due to a change in the underlying topology of the subject service model, the impact rules applicable to the nodes, etc. In an implementation, data indicative of the impact status table may be output to display, for example, as part of a graphical user interface. In an implementation, the impact status table may be included as part of table 1100 and/or table 1200.

Further implementations of the disclosure will now be described with reference to FIGS. 13, 14, and 15. The steps, or operations, of any method, process, or algorithm described in connection with the embodiments disclosed herein may be embodied directly in hardware, firmware, software executed by hardware, circuitry, or a combination of these. Broadly, methods 1300, 1400, and 1500 of FIGS. 13, 14, and 15, respectively, are used to perform certain monitoring and analysis in computing network 100. In an implementation, methods 1300, 1400, and/or 1500 may be executed using machines and hardware such as the equipment of FIGS. 1 through 4. In an implementation, methods 1300, 1400, and/or 1500 may be performed by components of system server 500. One or all of methods 1300, 1400, or 1500 may be performed, for example, by executing a machine-readable program of Javascript, C, or other such instructions. Implementations of the present disclosure may include multiple of the above-described features.

For ease of explanation, methods 1300, 1400, and 1500 are depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

Figure 13:
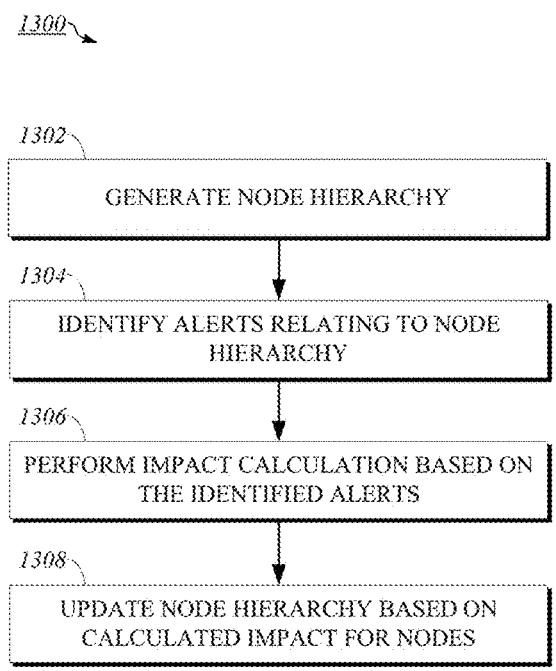
FIG. 13 is a flowchart showing an implementation of a method for processing alerts indicative of conditions of nodes of a computing infrastructure.

FIG. 13 is a flowchart showing an implementation of a method 1300 for processing alerts indicative of conditions of nodes of a computing infrastructure. Method 1300 begins at operation 1302, where a node hierarchy can be generated. In an implementation, generating the node hierarchy can mean creating data indicative of applicable nodes and impact rules, identifying previously created data indicative of applicable nodes and impact rules, selecting previously created data indicative of applicable nodes and impact rules from a list or set of such data, determining particular of such previously created data from such list or set based on desired or necessary characteristics of the data, or any other manner of preparing the node hierarchy for subsequent use. In an implementation, generating the node hierarchy may require new data be received from a user in order to properly prepare the node hierarchy for generation, or it may alternatively use only data already in storage. In an implementation, generating the node hierarchy includes generating data indicative of a graphical user interface of the node hierarchy, which data may be output to display on a computer, such as one or more client computers (e.g., clients 212, 214, 222, 224).

Regardless of the particular implementation, the node hierarchy can be generated based on nodes associated with a service model of a customer infrastructure and impact rules associated with those nodes, which impact rules define the manner in which the nodes are connected. In an implementation, generating the node hierarchy includes performing a discovery process, such as the discovery process discussed above with respect to FIG. 6, to identify the nodes comprising the node hierarchy (e.g., by using vertical discovery to identify nodes included within the underlying topology of a service model and horizontal discovery to identify nodes associated with nodes of the underlying topology). Implementations for generating the node hierarchy based on identified nodes and associated impact rules are described below with respect to FIG. 14.

At operation 1304, alerts relating to the node hierarchy generated in operation 1302 can be identified. In an implementation, identifying the alerts can mean identifying data indicative of alerts presently stored in connection with the customer infrastructure, identifying data indicative of alerts stored in a source external to the customer infrastructure by downloading or otherwise receiving the data from the external source, determining alerts to be identified based on a given context (e.g., for a given service model of the customer infrastructure), selecting alerts to be processed from a list or storage (e.g., a cache or temporal table for temporarily storing data indicative of the alerts), calculating alerts based on data concerning resources of a given service model associated with one or more sources internal or external to the customer infrastructure, or any other manner for identifying the alerts.

The alerts can be indicative of notifications of planned maintenance operations or any other configuration changes for resources of the customer infrastructure. For example, a planned maintenance operation may result in resources such as a switch, router, server, and the like having reduced or no capacity. Impairment may be defined in various ways to suit the intended application, but some examples include decisions based on features such as some or all of: component failure, slow response time, impaired availability, substandard consistency metrics, substandard reliability metrics, reduced bandwidth, status request failures, substandard route analytics, excessive memory usage, substandard CPU performance, poor network performance, low disk space availability, failed processes, certain HTTP return codes, certain SNMP traps, certain traffic flow volume or patterns, etc. Planned maintenance can also encompass system changes such as adding, removing, reconfiguring, or modifying system resources. In an implementation, alerts are identified with respect to discrete time intervals.

In one implementation, planned changes may be defined by a user, for example, by selecting one or more nodes in a CMDB, defining in words the type of changes planned, and indicating the date on and time at which the change will be done. A change request may undergo various stages until it is approved and executed. Planned changes may also be defined in other ways, such as via automatic remediation processes. A change request may or may not be effective until one or more authorized persons have approved the change. Whether or not or how a change request must be approved may vary depending on, for example, the potential impact or effect of the change. The alerts may further describe routine maintenance or other computing network changes not defined or planned by a client/user or administrator. For example, the one or more alerts may be indicative of sudden system changes reactive to security concerns or necessitated as a result of a resource becoming corrupted.

At operation 1306, impact calculation can be performed based on the identified alerts. This may include, for example, the system management module analyzing the state of the resources of the customer infrastructure, which includes identifying resources experiencing complete or partial functional impairment. In an implementation, operation 1306 includes the system management module identifying nodes of the node hierarchy having a self-severity vector that changed in response to one or more identified alerts. That is, impairment based on an identified alert can be reflected by affected nodes having a changed self-severity vector, which may be indicated using a flag, such as a bit for distinguishing between changed and unchanged values. In an implementation, and as discussed above with respect to FIG. 9, the flag may be graphically represented as part of the node hierarchy to depict the status of applicable nodes as being flagged for impact calculation. In an implementation, a common data structure may be used to track the nodes of the node hierarchy that are flagged at any given time. As a result of operation 1306, severity for nodes affected by the identified alerts can be determined based on a severity vector for each affected node. In an implementation, the severity vector comprises a self-severity vector representative of a degree to which the identified alert affects the severity of the node independent of the effect on any other nodes. In an implementation, the severity vector comprises a contribution vector representative of a degree to which a severity of nodes from which a given node depends affects the severity of the given node. In an implementation, severity can be calculated in parallel for all flagged nodes. Implementations for performing impact calculation are discussed below with reference to FIG. 15.

At operation 1308, the node hierarchy can be updated based on the impact values calculated at operation 1306. In an implementation, updating the node hierarchy comprises updating indications representative of severity for each value having changed in response to the impact calculation of operation 1306. For example, aesthetic indicators, such as the colored bricks discussed above with respect to FIG. 9, may be updated to reflect a new severity calculated for the corresponding resource. In an implementation, the node hierarchy can be updated even where no change is identified in response to calculating impact at operation 1306, for example, where a change is identified with respect to the impact rules, the underlying topology of the subject service model, the resources associated with the underlying topology, and/or any other configurable settings with respect to the resources comprising the node hierarchy. In an implementation, one or more of the impact tree, alert table, impact rule table, and impact status table may be updated along with the node hierarchy. In an implementation, operation 1308 comprises updating various aspects of the graphical user interface, such as the graphical representations of the node hierarchy, impact tree, alert table, impact rule table, and/or impact status table. For example, the graphical representations may be updated to reflect status indicators, flags, and other items that have been changed.

In an implementation, method 1300 further comprises generating output to display data indicative of a graphical representation of the various node data. The graphical representation of node data may comprise, for example, a graphical representation of one or more of the node hierarchy, an impact tree (e.g., impact tree 1000 of FIG. 10), an alert table (e.g., alert table 1100 of FIG. 11), an impact rule table (e.g., impact rule table 1200 of FIG. 12), and/or an impact status table. In an implementation, the output can be displayed at one or more computers, such as one or more clients or servers, depending on the user. In an implementation, a user may manipulate the displayed data to configure one or more of the nodes associated with the subject service model and the impact rules applicable to the nodes of the node hierarchy.

Figure 14:
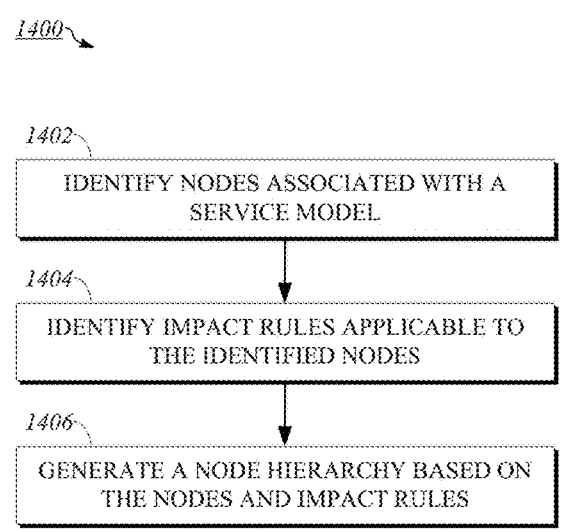
FIG. 14 is a flowchart showing an implementation of a method for generating a node hierarchy using impact rules and associated nodes.

FIG. 14 is a flowchart showing an implementation of a method 1400 for generating a node hierarchy using impact rules and associated nodes. In an implementation, method 1400 represents sub-operations for performing operation 1302 of method 1300. At operation 1402, nodes associated with a service model can be identified. In an implementation, operation 1402 comprises, first, identifying an underlying topology of a service model comprising nodes that are included as part of the service model, and, second, identifying nodes related to the nodes of the underlying topology that are not themselves included in the service model. The first part of this implementation may be done, for example, using vertical discovery to identify nodes of the service model. The second part of the implementation may be done, for example, using horizontal discovery to identify nodes related to, but not actually included in, the service model.

In an implementation, the nodes associated with the service model define an initial hierarchy of dependency relationships subject to modification by the impact rules to be applied at operation 1404. That is, for example, vertical discovery may initially generate a multi-leveled topology of nodes of the service model including top-down connections between the nodes. Horizontal discovery may thereafter add to this multi-leveled topology by connecting nodes related to nodes of the service model directly to the related nodes, for example, on a same or different level of the topology. Thus, a connection between nodes 908 and 910 of node hierarchy 900 may be indicative of horizontal discovery having identified one of those nodes, for example, node 908, as being related to the function of node 910. As discussed above, a node may be considered related to a node of a service model where a severity of the former has an effect on a severity of the latter.

At operation 1404, impact rules applicable to the nodes associated with the subject service model can be identified. The impact rules indicate the nature of the dependency between given nodes and surrounding nodes, including self-severity vector for the nodes and contribution vector for calculating an impact value for parents of the nodes. The self-severity vector can be indicative of a degree to which an alert affects the severity of a given node independent of the plurality of relationships. The contribution vector can be indicative of a degree to which children of a given node affect the severity of the node and is comprised of various contribution percentages. For example, in a cluster of five nodes, where the cluster is considered affected only if at least three of the nodes are affected, each node of the cluster will have a contribution percent of approximately 33 percent. In an implementation, the extendable rules can be initially set to default values representative of typical relational data for the corresponding nodes. However, the extendable rules are subject to modification (e.g., by a client/user or administrator) to redefine the relational data as desired. In an implementation, a relationship can be indicative of a degree to which the severity of a given child node contributes to the severity of a parent node. Node hierarchy 900 can be generated using configurable impact rules for defining the relationship strategies, depending, for example, on the specific topology underlying the subject service model. In an implementation, the impact rules are initially defined based on default settings generally applicable to the corresponding resources of the service model.

In an implementation, default impact rules are available for impact calculation. For example, a default impact rule for calculating impact for hosts in a cluster of resources indicates how host cluster member affect an overall status of the cluster, which may be based on a percentage or number of cluster members. Thus, where a three-host cluster requires a fifty percent influence to set the severity to "major," each member can be considered to have a seventeen percent influence (e.g., the requirement divided by the number of host cluster members). Another example of a default impact rule may apply the same or similar logic to cluster members, generally. Other examples may include rules for defining impact propagation for nodes in infrastructure relationships, determining the extent to which an impact applies to parent or child nodes within a given service model, limiting impact to not affect child nodes of effected nodes, and determining how impact applies to network or storage nodes involving redundancies.

In an implementation, a user may modify one or more default impact rules as desired to reconfigure the manner in which impact is performed. In an implementation, a user may modify a list of available impact rules, for example, by defining new rules to be used in impact calculation. In an implementation, modification of default impact rules and/or defining new impact rules includes determining the nodes associated with a service model to which the impact rule applies (e.g., only parent nodes, only nodes in clusters, only applicative resources, etc.), setting values indicative of the degree to which severity of a node influences impact of another node (e.g., how child severity affects a parent node where impact direction is from child to parent, or how parent severity affects a child node where impact direction is from parent to child), and indicating impact based on a calculated severity.

In an implementation, based on the applicable resource, the extendable rules may indicate a strategy for connecting a given node to the node hierarchy and/or providing a contribution vector to be used in calculating the impact value of a parent node. For example, by default, an extendable rule for a host resource may indicate that the host is to be connected as a child node to all resources running on the host, and an extendable rule for a hypervisor resource may indicate that the hypervisor is to be connected as a child node to the host, where the hypervisor resource has a 100 percent contribution percentage with respect to the host.

By changing the values for extendable rules, applicable nodes may be adjustably connected to different portions of the node hierarchy, may be connected to a larger or smaller pool of parents and/or children, include different values for the self-severity vector and/or contribution percentage, etc. The default values for the extendable rules may be replaced or supplemented, at the discretion of the party changing the values. In an implementation, the node hierarchy can be updated in response to a change being made to the impact rules. In an implementation, the default parameters for the impact rules may be maintained separate from user-configured versions of the impact rules, for example, so that a user may selectively choose to apply default or configured parameters to nodes.

At operation 1406, the node hierarchy can be generated based on the identified nodes and applicable impact rules. In an implementation, generating the node hierarchy comprises identifying changes to the service model topology imposed by the applicable impact rules, for example, to move the location of nodes within the topology (e.g., by switching nodes 908 and 910 of node hierarchy 900, or by moving node 904 above or otherwise connecting it to node 908 such that it becomes a parent node of node 908). In an implementation, generating the node hierarchy comprises determining various characteristics of the identified nodes based on the applicable impact rules. For example, generating the node hierarchy may comprise determining which nodes are child nodes, which nodes are parent nodes of corresponding child nodes, relationship between child nodes and their parent nodes, the direction of impact as calculated based on the relationships (e.g., parent to child or child to parent), etc.

In an implementation, operation 1402 comprises generating a preliminary node hierarchy based on the resources associated with a subject service model. For example, operation 1402 may first include identifying service resources associated with the subject service model including dependency relationships between the service resources. This mapping provides the framework for the node hierarchy to be generated at operation 1406. Next, operation 1402 identifies infrastructure resources corresponding to the identified service resources and associating same with the service resource mapping. This may be implemented, for example, by connecting nodes representative of the service resources to the nodes representative of the corresponding infrastructure resources, or by generating separate layers for the service resources and corresponding infrastructure resources and indicating a mapping for relating nodes of the layers. In an implementation, data representative of the nodes may be identified from a network topology representing the hierarchy of and relationships between the nodes of the subject service model.

Thus, in an implementation, operation 1404 may be performed once the node hierarchy foundation is generated at operation 1402. In an implementation, operation 1404 may be performed on a node-by-node basis wherein the foregoing steps are performed upon each node being added to the node hierarchy foundation generated at operation 1402. Regardless of the particular implementation, operation 1404 includes associating values representative of impact rules with the nodes associated with the subject service model. For example, operation 1404 may include associating a contribution percentage and/or a severity map, as discussed above with respect to FIG. 8, to the nodes. In an implementation wherein the nodes are identified from a network topology, the impact rules are applied by traversing the network topology for nodes corresponding to applicable impact rules, for example, based on the resource represented by a node and the relationship between it and other connected nodes.

In an implementation, operation 1402 and 1404 may be switched such that method 1400 first comprises identifying impact rules applicable to a given service model, for example, based on an association between the impact rules and a service model identifier such as the service model identifier described above with respect to FIG. 8. In this case, method 1400 would thereafter populate the node hierarchy with resources corresponding to the identified impact rules and determine dependency relationships for the resources based on the impact rules at the time the nodes are added to the node hierarchy.

Figure 15:
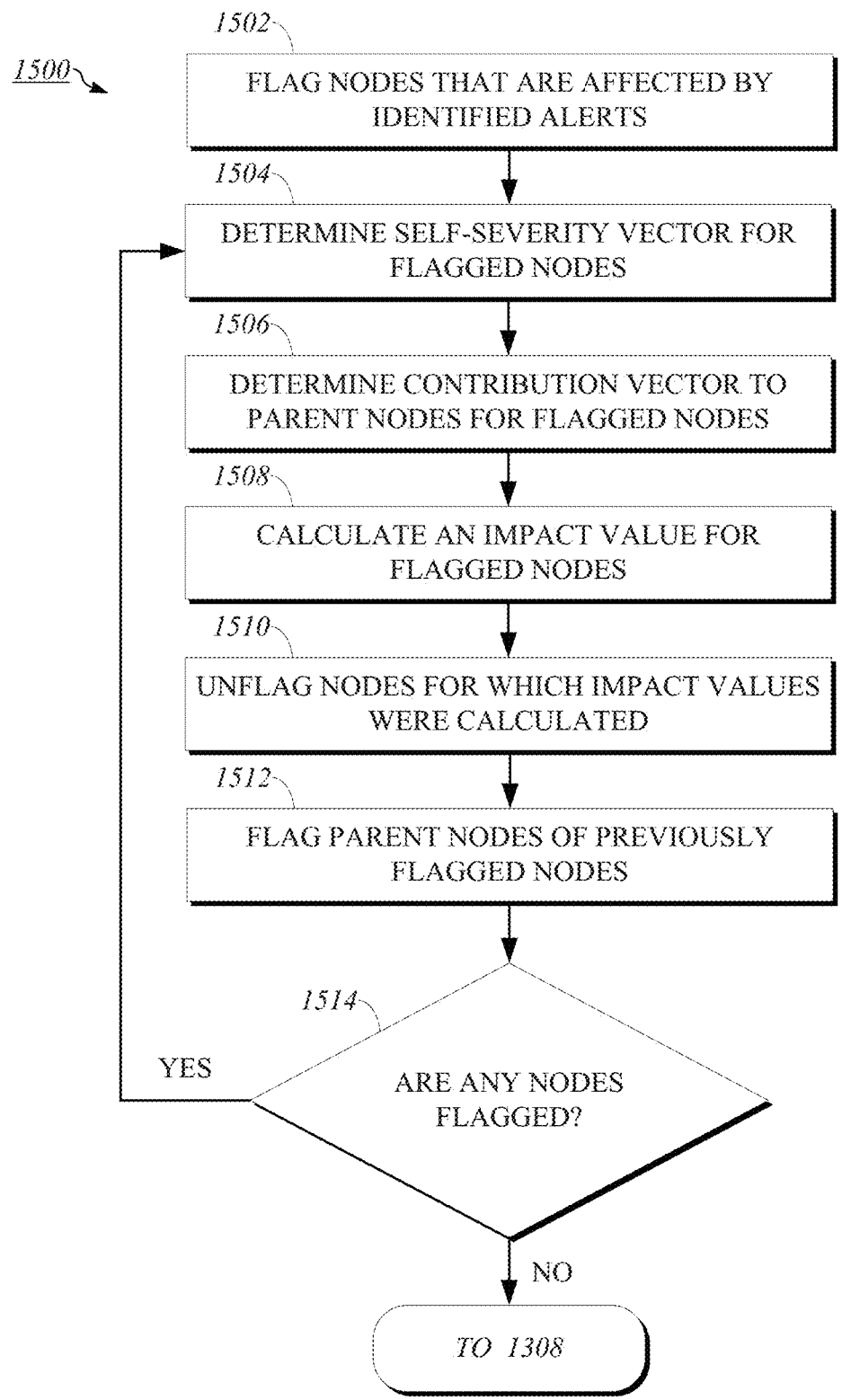
FIG. 15 is a flowchart showing an implementation of a method for performing impact calculation in parallel for nodes of a node hierarchy.

FIG. 15 is a flowchart showing an implementation of a method 1500 for performing impact calculation in parallel for nodes of a node hierarchy. In an implementation, method 1500 represents sub-operations for performing operation 1306 of method 1300.

At operation 1502, any nodes affected by identified alerts can be flagged. For example, the system management module may determine whether any nodes associated with the subject service model were functionally impaired or otherwise affected by any of the identified alerts. Any such impaired or affected nodes may thus be flagged. In an implementation, operation 1502 comprises indicating nodes having a severity value that changed based on the identified alerts. For example, operation 1502 may comprise identifying nodes having a self-severity vector that has changed as a result of an alert being identified and indicate those nodes in some way (e.g., by including operation 1504, discussed below). In an implementation, operation 1502 may merely comprise indicating nodes to which the identified alerts may apply, for example, to consider applicable nodes for impact calculation. In an implementation, the identified alerts may have an associated severity such that identifying nodes having a severity that changed based on the identified alerts comprises determining whether a previously-calculated severity for a node is the same as the severity associated with an alert.

In an implementation, indicating these nodes comprises marking them with a flag (e.g., flagging). In an implementation, other forms of indication may be used, for example, by changing a color of a tile of the corresponding node in the node hierarchy, including data indicative of the indication in a header, etc. In an implementation, the flag may itself be a bit included within a header of data representative of the node and/or a graphical representation included on a graphical representation of, for example, the node hierarchy, impact status table, etc.

In an implementation, a data structure may be included, for example, within the system management module, for identifying the nodes of a node hierarchy that have been flagged for impact calculation. For example, the data structure may be a queue of nodes to be processed or a table for storing and representing data indicative of those nodes.

In an implementation, impact values for the indicated nodes can be calculated at operation 1508 based on data determined at operations 1504 and 1506. In an implementation, impact calculation can be performed recursively based on the self-severity of each node associated with the subject service model and a contribution vector representative of a degree to which the severity of child nodes of a given parent node affect the severity of that parent node. In an implementation, the impact value can be calculated by combining corresponding values of the self-severity and contribution vectors. Thus, the impact value of the nodes of the node hierarchy can be indicative of an overall impact of the applicable alerts on the node relative to the health of the service model (and customer infrastructure).

In an implementation, the self-severity vector and contribution vector for a node include a list of impact categories and a value, such as a percentage, associated with each category. For example, the impact categories may define a range of significance from a minimally significant category (e.g., info/clear) indicative of no change to node severity being identified based on an alert, to a maximally significant category (e.g., critical) indicative of a severe change to node severity being identified based on an alert, with incrementally heightened categories intermediately defined (e.g., warning, minor, and major). In an implementation, the vectors do not include a category indicative of no change to node severity being identified, wherein that indication is instead made by the values of the vector categories remaining unchanged in view of the identified alerts. While the values for the self-severity vectors and contribution vectors are discussed above and below as percentages, any value can be used instead provided that a threshold can be recognized for identifying a controlling severity. Further, in calculating impact for the node hierarchy, certain nodes may have their impact values calculated more than once for a given alert or set of alerts.

In an implementation, certain portions of method 1500, for example, operations 1504, 1506, and 1508, are performed in parallel for the nodes flagged at operation 1502. For example, one or more of operations 1504, 1506, and 1508 can be performed in parallel for all nodes flagged at operation 1502. In an implementation, parallelization of impact calculation refers to the performance of impact calculation, either in whole or in various parts, for example, operations 1504, 1506, and/or 1508, simultaneously (or essentially so, such as to the extent permitted by hardware) for all flagged nodes. For example, at operation 1504, the self-severity vector can be determined in parallel for all nodes flagged at operation 1502. The contribution vector to parent nodes can be determined at operation 1506 in parallel for all nodes for which the self-severity vector was determined at operation 1504. The impact value can then be calculated in parallel for all nodes for which the contribution vector to parents was determined at operation 1506. In an implementation, only operation 1508 is performed in parallel. In an implementation, other operations of method 1500, for example, operations 1510 and 1512, can also be performed in parallel for applicable nodes of the node hierarchy. In this way, the impact value for all nodes affected by an identified alert can be processed at or near the same time. Parallel processing of the nodes has benefits for a system on which the processing occurs, such as a system server. For example, it can reduce the total amount of time needed for performing impact calculation on the node hierarchy (e.g., by not waiting for each individual level of the node hierarchy to be processed before proceeding to the next). In this way, parallel impact calculation can free up system resources for other processing. It can also obviate the use of system resources for processing nodes not affected by the identified alerts.

First, at operation 1504, a self-severity vector is determined for the nodes indicated at operation 1502. In an implementation, the severity of a node based on the values of a self-severity vector is the highest severity value determined based on the identified alerts. For example, where a self-severity vector for a node based on applicable alerts has the categories <warning, minor, major, critical> and corresponding values <100%, 100%, 100%, 0%>, the severity for the node as determined by the self-severity vector is "MAJOR." Thus, in an implementation, indicating the nodes having a self-severity vector that changed based on the alerts may be done at operation 1504 instead of operation 1502.

In an implementation, and as discussed above with respect to table 1200 of FIG. 12, applicable impact rules may indicate an alternative impact value to use in place of a severity indicated by the self-severity vector. For example, where an impact rule applicable to this node indicates that the impact value when major is "MINOR," the severity reflected by the self-severity vector may be "MINOR." However, in an implementation, alternative impact values of impact rules are only applicable to severities calculated after consideration of a contribution vector, as discussed below with respect to operation 1506.

Next, at operation 1506, a contribution vector is determined based on the child nodes of the nodes indicated at operation 1502. As discussed above, the details of how child nodes contribute to the severity of a parent node are defined by impact rules applicable to those nodes. In an implementation, the impact rules may indicate a conversion of values of a severity vector for the child nodes. For example, an impact rule may indicate to convert the values for vector categories to the next-lowest category. Thus, where a child node has a severity vector (e.g., as a self-severity vector or a vector representative of combined values from a self-severity vector and contribution vector) of <100%, 100%, 80%, 40%>, the resulting converted values would be <100%, 80%, 40%, 0%>. As another example, an impact rule may indicate to convert the values for vector categories to half of their current value. Thus, where the child node has a severity vector of <100%, 100%, 80%, 40%>, the resulting converted values would be <50%, 50%, 40%, 20%>.

In an implementation, the impact rules may indicate a percentage of contribution of child node vector values to the severity of the parent node. For example, an impact rule may indicate that a given child node contributes 40% to its parent node. Thus, where the child node has a severity vector of <100%, 100%, 80%, 40%>, the resulting contribution vector values would be <40%, 40%, 32%, 16%>. In an implementation, multiple impact rules may be applied to determine a contribution vector for a parent node. For example, an impact rule for converting values may apply to a first child node and a different impact rule for indicating a percentage of contribution may apply to a second child node. In an implementation, multiple contribution vectors may be calculated and combined into a single contribution vector based on the contribution values from the child nodes of a parent node. In an implementation, a single contribution vector can be calculated based on multiple contribution values from the child nodes.

At operation 1508, an impact value for the flagged nodes is calculated based on the self-severity vector and the contribution vector. In an implementation, the impact value or severity for a node can be calculated by adding corresponding values of the self-severity vector and the contribution vector, wherein the highest-resulting severity is determined to be the overall severity for the node. In an implementation where the vector values are percentages, the overall severity for a node can be the highest-resulting such severity with a value of one hundred percent or more. For example, where the self-severity vector is <60%, 40%, 20%, 0%> and the contribution vector is <40%, 20%, 80%, 50%>, the calculated severity for the node is "MAJOR" since it is the highest severity category meeting or exceeding the threshold value of 100%. In another example, where the self-severity vector is <100%, 100%, 0%, 0%> and the contribution vector is <100%, 100%, 100%, 0%>, the calculated severity for the node is still "MAJOR" even though the value for that category in the self-severity value was 0% (e.g., because the corresponding values for major from each vector when summed still met the threshold value of 100%). As discussed above, the overall severity may be changed to an alternate impact value, subject to the impact rules applicable to the subject node.

At operation 1510, the nodes for which calculations were performed at operation 1508 are unflagged. In an implementation, unflagging the nodes comprises removing the indication made to the node at operation 1502. The nodes may be unflagged, for example, to prevent system confusion upon determining whether further impact calculation should be performed for any nodes of the node hierarchy, such as is determined at operation 1514. In an implementation, operation 1510 comprises indicating the unflagging of nodes to a common data structure used to store data about the nodes that are updated at any given time.

At operation 1512, the parent nodes of all previously flagged nodes are flagged. In an implementation, operation 1512 comprises indicating (e.g., flagging) parent nodes having a severity that changed in response to the parallel calculations performed in operations 1504, 1506, and 1508. For example, because contribution vectors indicative of a degree to which the severity of child nodes affects a severity of parent nodes may have been changed at operation 1506, the parent nodes of the node for which operations 1504, 1506, and 1508 were performed may be flagged for impact calculation (e.g., by repeating the routine initiated at operation 1504). In an implementation, parent nodes of previously flagged nodes are not flagged at operation 1512, for example, where the contribution vector from a parent node's children does not affect the severity of the parent node. In this situation, neither the parent, nor any parents of the parent, are flagged at operation 1512. In an implementation, operation 1512 can be performed by iterating through the node hierarchy beginning on a lowest level of the node hierarchy having any nodes that were previously flagged and proceeding upwardly within the node hierarchy until all levels have been considered.

In an implementation, operation 1510 can be performed before operation 1512, for example, by maintaining a record of unflagged nodes having parent nodes to be flagged for further processing in a data structure, such as the data structure discussed above with respect to operation 1502. In an implementation, operation 1510 can be performed after operation 1512, for example, by maintaining a record of processed nodes to be unflagged and not further processed. In an implementation, operations 1510 and 1512 can be performed simultaneously or essentially so, to the extent permitted by hardware.

At operation 1514, method 1500 determines whether or not to repeat based on whether further impact calculation is to be performed on any nodes. In an implementation, the node hierarchy (and/or impact status table or other structures used for storing and representing data for the nodes) may be iteratively searched, for example, using a probe or query, which may be requested by or through the system management module, to determine whether any nodes of the node hierarchy are flagged or otherwise indicated. Thus, operation 1514 returns an affirmative response if any nodes were flagged at operation 1512. If an affirmative response is returned by operation 1514, method 1500 next returns to operation 1504 to repeat the calculation steps with respect to the applicable nodes, for example, the nodes flagged at operation 1512. However, if an affirmative response is not returned by operation 1514, method 1500 completes. In an implementation, for example, where method 1500 represents sub-operations for performing operation 1306 of method 1300, the completion of method 1500 leads to a next operation, such as operation 1308 of method 1300.

In an implementation, the severity for a node can be recalculated multiple times during method 1500. For example, a given node having children can be flagged for impact calculation at operation 1502. The severity for the node can be calculated in parallel with other flagged nodes via operations 1504, 1506, and 1508. The node can be unflagged at operation 1510. However, where the children of the node were also flagged at operation 1502, the node can be flagged for further impact calculation processing at 1512.

The impact value is calculated in parallel for each flagged node. Thus, it is not necessary to calculate the impact value for each flagged node on a given level of the node hierarchy before moving on to another level. Rather, the impact of identified alerts on multiple nodes at varying levels of the node hierarchy can be determined in a single instance such that a system on which method 1500 is implemented processes each of the impact calculations simultaneously (or essentially so, such as to the extent permitted by hardware). In an implementation, performing parallel impact calculation may require the use of one or more CPUs having multiple cores. In an implementation, impact calculation can be agnostic to nodes in the node hierarchy in that the particular arrangement of the node hierarchy does not affect how the impact values for the nodes are calculated. Thus, the operations of method 1500 can focus on characteristics such as initial severity, service model topology, node type, etc.

While the foregoing disclosure shows a number of illustrative embodiments, it will be apparent to those skilled in the art that various changes and modifications can be made herein without departing from the scope of the disclosure as defined by the appended claims. Accordingly, the disclosed embodiment are representative of the subject matter which is broadly contemplated by the present disclosure, and the scope of the present disclosure fully encompasses other embodiments which may become obvious to those skilled in the art, and that the scope of the present disclosure is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Furthermore, although elements of the disclosure may be described or claimed in the singular, reference to an element in the singular is not intended to mean "one and only one" unless explicitly so stated, but shall mean "one or more." Additionally, ordinarily skilled artisans will recognize in view of the present disclosure that while operational sequences must be set forth in some specific order for the purpose of explanation and claiming, the present disclosure contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Further, any routines, platforms, or other functionality as disclosed herein associated with or implemented as software may be performed by software modules comprising instructions executable by a process for performing the respective routine, platform, or other functionality.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

It is to be understood that the present disclosure is not to be limited to the disclosed implementations but, on the contrary, is intended to cover various modifications and equivalent arrangements included within the scope of the appended claims.

What is claimed is:

1. A system, comprising:
a processor; and
a memory, accessible by the processor, the memory storing instructions, that when executed by the processor, cause the processor to perform operations comprising:
generating a node hierarchy comprising a plurality of nodes that represent a plurality of respective configuration items in a configuration management database, wherein the plurality of respective configuration items are associated with a service model, and a relationship between two or more nodes of the node hierarchy is based on one or more impact rules defining a degree of impact contribution between the two or more nodes;
receiving an indication of an alert affecting a first set of nodes of the plurality of nodes in the node hierarchy; and
performing impact calculation against the node hierarchy based on the alert, comprising:
calculating a first impact value for a first node of the first set of nodes and a second impact value for a second node of the first set of nodes in parallel, wherein the first node and the second node are at different levels of the node hierarchy;
identifying a second set of nodes of the plurality of nodes in the node hierarchy, wherein the second set of nodes includes a third node having the relationship with the first node; and
calculating a third impact value for the third node based on the first impact value and the one or more impact rules.

2. The system of claim 1, wherein the first node and the third node are at different levels in the node hierarchy.

3. The system of claim 1, wherein the operations comprise transmitting, to a computing device, a graphical user interface comprising the node hierarchy after generating the node hierarchy.

4. The system of claim 3, wherein performing impact calculation against the node hierarchy based on the alert comprises transmitting, to the computing device, an updated graphical user interface, wherein the updated graphical user interface comprises the node hierarchy and indications of the first impact value calculated for the first node, the second impact value calculated for the second node, or the third impact value calculated for the third node, or a combination thereof.

5. The system of claim 3, wherein performing impact calculation against the node hierarchy based on the alert comprises:
calculating an overall status of the service model based on the first impact value and the third impact value; and transmitting, to the computing device, an updated graphical user interface, wherein the updated graphical user interface comprises an indication of the overall status of the service model.

6. The system of claim 1, wherein the first node is a child node of the third node.

7. A method, comprising:
transmitting, to a computing device via one or more processors, a graphical user interface comprising a node hierarchy that includes a plurality of nodes that respectively represent a plurality of configuration items in a configuration management database, wherein the plurality of configuration items are associated with a service model, and each relationship between respective nodes of the node hierarchy is based on one or more impact rules;
receiving, via the one or more processors, an indication of an alert affecting a first set of nodes of the plurality of nodes in the node hierarchy;
performing, via the one or more processors, impact calculation against the node hierarchy based on the alert, comprising:
calculating respective first impact values in parallel for each node of the first set of nodes affected by the alert, wherein the first set of nodes comprises a first node and a second node at different levels of the node hierarchy; and
calculating respective second impact values in parallel for each node of a second set of nodes having respective relationships with one or more nodes of the first set of nodes; and
transmitting, to the computing device via the one or more processors, an updated graphical user interface, wherein the updated graphical user interface comprises the node hierarchy and respective status indicators associated with each node of the first set of nodes that are representative of the respective first impact values and respective status indicators associated with each node of the second set of nodes that are representative of the respective second impact values.

8. The method of claim 7, wherein performing, via the one or more processors, impact calculation against the node hierarchy based on the alert comprises calculating an overall status of the service model based on the respective first impact values and the respective second impact values.

9. The method of claim 8, wherein the updated graphical user interface comprises an indication of the overall status of the service model.

10. The method of claim 7, wherein the one or more impact rules define a degree of impact contribution between two or more nodes associated with each relationship.

11. The method of claim 10, wherein the degree of impact contribution between the two or more nodes associated with each relationship comprises the degree of impact contribution from a child node associated with each relationship to a parent node associated with each relationship.

12. The method of claim 7, wherein the second set of nodes comprises a third node and a fourth node at different levels in the node hierarchy.

13. A non-transitory, computer-readable medium, comprising instructions that when executed by one or more processors, cause the one or more processors to perform operations comprising:
generating a node hierarchy comprising a plurality of nodes that respectively represent a plurality of configuration items in a configuration management database, wherein the plurality of configuration items are associated with a service model, and each relationship between respective nodes of the node hierarchy is based on one or more impact rules defining a degree of impact contribution between a first node associated with each relationship and a second node associated with each relationship;
transmitting, to a computing device, a graphical user interface comprising the node hierarchy and respective status indicators associated with each node of the node hierarchy;
receiving an indication of an alert affecting a first set of nodes of the plurality of nodes in the node hierarchy;
performing impact calculation against the node hierarchy based on the alert, comprising:
calculating respective first impact values in parallel for each node of the first set of nodes affected by the alert, wherein the first set of nodes comprises a first node and a second node at different levels of the node hierarchy;
identifying a second set of nodes of the node hierarchy having respective relationships with one or more nodes of the first set of nodes; and
calculating respective second impact values in parallel for each node of the second set of nodes based on the respective first impact values and the one or more impact rules; and
transmitting, to a computing device, an updated graphical user interface comprising the node hierarchy, respective updated status indicators associated with each node of the first set of nodes that are indicative of the respective first impact values, and respective updated status indicators associated with each node of the second set of nodes that are indicative of the repective second impact values.

14. The non-transitory, computer-readable medium of claim 13, wherein performing impact calculation against the node hierarchy based on the alert comprises calculating an overall status of the service model based on the respective first impact values and the respective second impact values.

15. The non-transitory, computer-readable medium of claim 14, wherein the updated graphical user interface comprises an indication of the overall status of the service model.

16. The non-transitory, computer-readable medium of claim 13, wherein the degree of impact contribution between two nodes associated with each relationship comprises the degree of impact contribution from a child node associated with each relationship to a parent node associated with each relationship.

17. The non-transitory, computer-readable medium of claim 13, wherein the second set of nodes comprises a third node and a fourth node at different levels in the node hierarchy.

* * * * *